United States Patent
Hopkins et al.

(10) Patent No.: US 11,755,651 B2
(45) Date of Patent: *Sep. 12, 2023

(54) METHOD, APPARATUS, AND COMPUTER-READABLE MEDIUM FOR GENERATING CATEGORICAL AND CRITERION-BASED SEARCH RESULTS FROM A SEARCH QUERY

(71) Applicant: Agora Intelligence, Inc., Santa Clara, CA (US)

(72) Inventors: Kevin Hopkins, Sandy, UT (US); Jarom Smith, Saratoga Springs, UT (US)

(73) Assignee: AGORA INTELLIGENCE, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/091,868

(22) Filed: Nov. 6, 2020

(65) Prior Publication Data

US 2021/0117478 A1    Apr. 22, 2021

Related U.S. Application Data

(63) Continuation of application No. 15/976,380, filed on May 10, 2018, now Pat. No. 10,860,652.
(Continued)

(51) Int. Cl.
*G06F 16/9032* (2019.01)
*G06F 16/9535* (2019.01)
(Continued)

(52) U.S. Cl.
CPC .... *G06F 16/90328* (2019.01); *G06F 16/3338* (2019.01); *G06F 16/951* (2019.01); *G06F 16/9535* (2019.01); *G06F 16/9566* (2019.01)

(58) Field of Classification Search
CPC ......... G06F 16/90328; G06F 16/9566; G06F 16/9535; G06F 16/951; G06F 16/3338
(Continued)

(56) References Cited

U.S. PATENT DOCUMENTS

| 2003/0050924 A1* | 3/2003 | Faybishenko | ....... G06F 16/9535 707/E17.061 |
| 2003/0171876 A1* | 9/2003 | Markowitz | ............ G16B 50/30 702/20 |

(Continued)

*Primary Examiner* — Shahid A Alam

(74) *Attorney, Agent, or Firm* — Amardeep S. Grewal; Reed Smith LLP

(57) ABSTRACT

A method for generating categorical and criterion-based search results from a search query including receiving the search query, generating one or more query fragments, determining a category corresponding to the search query, determining one or more filters applicable to the search query and one or more core search terms applicable to the search query based at least in part on the determined category and the one or more query fragments, generating at least one custom query for at least one target database in the one or more target databases based at least in part on the one or more filters, the one or more core search terms, the determined category, and one or more attributes of the at least one target database, and executing the at least one custom query on the at least one target database to generate a set of search results.

18 Claims, 14 Drawing Sheets

Related U.S. Application Data

(60) Provisional application No. 62/504,195, filed on May 10, 2017.

(51) Int. Cl.
*G06F 16/955* (2019.01)
*G06F 16/951* (2019.01)
*G06F 16/33* (2019.01)

(58) Field of Classification Search
USPC .......................................................... 709/706
See application file for complete search history.

(56) References Cited

U.S. PATENT DOCUMENTS

| | | | |
|---|---|---|---|
| 2006/0101003 A1* | 5/2006 | Carson | G06F 16/9535 |
| 2007/0208744 A1* | 9/2007 | Krishnaprasad | H04L 63/083 |
| | | | 707/999.009 |
| 2010/0293494 A1* | 11/2010 | Schmidt | G06Q 30/02 |
| | | | 707/E17.02 |
| 2011/0208690 A1* | 8/2011 | Cushing | G06F 16/283 |
| | | | 707/769 |
| 2012/0110515 A1* | 5/2012 | Abramoff | G06F 16/904 |
| | | | 715/854 |
| 2013/0013580 A1* | 1/2013 | Geller | G06F 16/285 |
| | | | 707/706 |
| 2014/0046926 A1* | 2/2014 | Walton | G16H 10/20 |
| | | | 707/710 |
| 2017/0255700 A1* | 9/2017 | Shiftman | G06F 16/338 |

\* cited by examiner

METHOD, APPARATUS, AND COMPUTER-READABLE MEDIUM FOR GENERATING CATEGORICAL AND CRITERION-BASED SEARCH RESULTS FROM A SEARCH QUERY

RELATED APPLICATION DATA

This application is a continuation of U.S. Nonprovisional application Ser. No. 15/976,380, filed May 10, 2018, which claims priority to U.S. Provisional Application No. 62/504,195, filed May 10, 2017, the disclosures of which are hereby incorporated by reference in their entirety.

BACKGROUND

Cross-website "keyword search," sometimes referred to as "Internet Search" or, simply, "Search," is a method of retrieving specified information (such as product information, services information, news items, links to Internet websites, web applications, mobile applications, images, videos, and/or other types of information) from large collections of websites that are related to a specific "search term," sometimes referred to as a "keyword" or a "search query."

Typically a keyword search is conducted against a database of Internet websites that have been parsed, via a digital technique known as "spidering," which digitally "reads" and assesses the content of such websites, or some other similar means. This parsing process identifies, through any of a number of different methods, a set of descriptors that characterize the content of the website and/or constituent portions of the website. The respective websites and/or portions of websites (collectively, "websites") are ranked, via some algorithmic means or other method, in terms of relevance or some other criterion with respect to each of these individual descriptors. The server locations of these sites (collectively referred to as "website links"), descriptors, and rankings are then aggregated into a global database.

In the most abstract sense, when a user enters a search term into a "search box" on some computing device, the search system: (1) compares the search term to its database of descriptors; (2) identifies the descriptor(s) most closely matching the search term (with the matching conducted by any number of algorithms or other methods); (3) identifies all or a subgroup of sites most closely associated with the indicated descriptor(s) (for example, using the aforementioned ranking scheme to cull out subgroups of sites); and then (4) displays the links to these sites, with said links typically called "search results," in some either random or rank-ordered format. Users then can select, click on, or otherwise activate the links to one or more sites in order to open the respective sites in a web browser or some other website-viewing software or device.

The search method just described is probabilistic in nature, meaning that the inclusion or exclusion of a given site in the search-results lists—and the rank-ordering of the site within that list—is determined by the probability that the site's content and characteristics satisfy the algorithmic selection method. As a result, some sites that would be relevant to the search query are excluded or, if included, ranked at a low level. Additionally, sites that are not relevant to the query may be included and, sometimes, ranked highly.

One of the problems with existing search methods is that these methods typically search databases corresponding to a large universe of sites once a search query is made. These databases typically contain links to sites of a wide variety of types, including but not limited to ecommerce websites, news and information websites, social-media websites, and other types of sites. The databases also typically include links to sites of widely varying quality, ranging from very well-known and well-produced sites to blogs and similar sites created by a single individual, and often of a very low quality. Because of the probabilistic nature of the search process, if the algorithmic selection and ranking process is made more restrictive so as to exclude less relevant sites, an often larger proportion of relevant sites are also excluded. On the other hand, if the algorithmic selection and ranking process is made less restrictive so as to include a greater proportion of relevant sites, then an often significant proportion of less relevant sites are also included. This problem is particularly pronounced with regard to product, service, and ecommerce searches, which typically omit from 50% to 90% or more of relevant sites, sometimes including many high-profile relevant sites, while simultaneously including some or many sites that don't even sell products.

Another problem with existing search methods is that the rank-ordering methods typically used, while sometimes relevant and while often leading to an accurate selection of search results at the top of the search-results list, lead to orderings that, on their face, appear to be random and bear no substantive relationship to the user's search. Again, this problem is particularly apparent in searches for products, services, and ecommerce sites, where there are few objective measures for ranking sites' "bestness" or appropriateness for a given search—especially when the often hidden individual preferences and other factors are taken into consideration. To illustrate by way of just one example, if a user searches for "men's shoes," the ordering of the search results typically has no relationship to any substantively-useful ordering of the "best places" to purchase shoes. The resultant ordering of sites in search results is thus at least partly or wholly random from a utility standpoint, and the attendant disorganization of sites in search-results lists makes them very difficult and time-consuming to browse.

Yet another problem with existing search methods is that such methods rarely handle specific criterion-based searches very well. To continue the previous example, if a user searches on a typical search engine for "men's shoes," the results that are presented are likely to be reasonably accurate. However, if a user were to search on a typical search engine for, say, "men's black Florsheim loafers, Size 10," the search results typically can be highly inaccurate, to the point that some searches return no fully accurate search results within the first page of search-results listings. This problem is due to the fact that probabilistic, algorithmic-based searches have an inherently difficult time accounting for and ranking sites according to a large number of specific criteria.

Some individual ecommerce sites use dropdown menus or other manual-selection methods to enable users to add specific criterion to their searches, but these methods are rarely if ever employed on cross-site search engines (other than for easily specified values, such as recency). Even if they were so employed, such methods would be exceedingly difficult to implement on the highly diverse universes of sites that most general search engines search.

Accordingly, improved systems and methods for search are needed that are easier to use, return more accurate and complete search results, and do so more quickly.

DETAILED DESCRIPTION OF THE DRAWINGS

While methods, apparatuses, and computer-readable media are described herein by way of examples and embodiments, those skilled in the art recognize that methods, apparatuses, and computer-readable media for generating categorical and criterion-based search results from a search query are not limited to the embodiments or drawings described. It should be understood that the drawings and descriptions are not intended to be limited to the particular form disclosed. Rather, the intention is to cover all modifications, equivalents, and alternatives falling within the spirit and scope of the appended claims. Any headings used herein are for organizational purposes only and are not meant to limit the scope of the description of the claims. As used herein, the word "can" is used in a permissive sense (i.e., meaning "having the potential to") rather than in the mandatory sense (i.e., meaning "must"). Similarly, the words "include," "including," and "includes" are used to mean "including, but not limited to." Also, unless otherwise and specifically indicated, the word "or" is used in an inclusive sense (meaning "one, both, or all of") rather than in the exclusive, binary sense (meaning, "either this OR that, but not both of").

The Applicant has discovered systems and methods that automatically convert a simple keyword-type Internet or database search into a real-time, context-specific, criterion-based search. This automatic conversion enables users to include criterion words (i.e., search-term modifiers, constraints, or other specifications) as regular, undifferentiated parts of a search term (i.e., all words mixed together as part of a single phrase, without special indicators or other delimiters or punctuation placed on the criterion words), but to have these particular words used as specific, criterion-based delimiters when the search is actually performed.

Figure 1A:
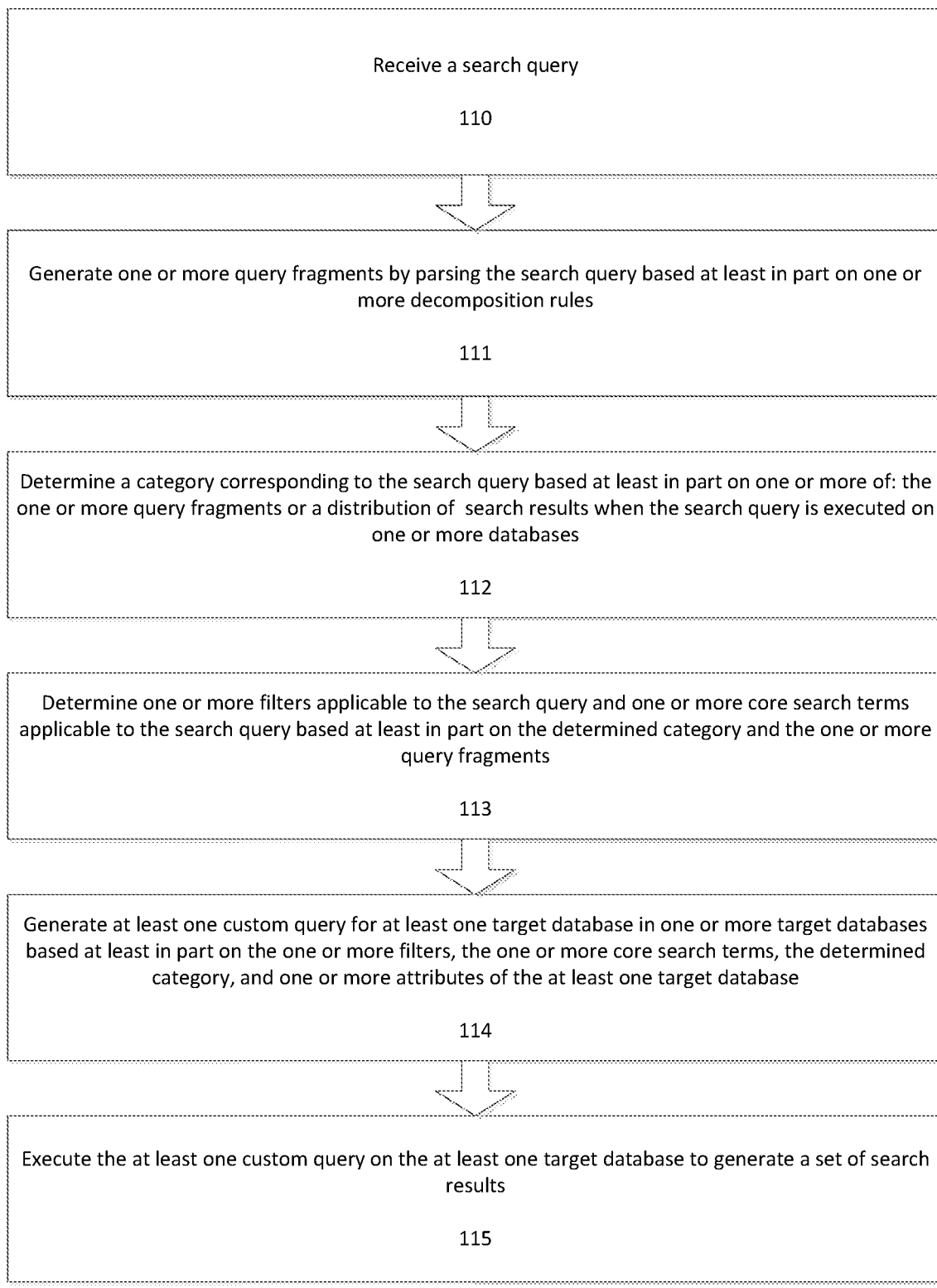
FIGS. 1A-1B illustrate flowcharts for generating categorical and criterion-based search results from a search query according to an exemplary embodiment.

FIG. 1A illustrates a flowchart for generating categorical and criterion-based search results from a search query. At step 110 the search query is received. This step is discussed in greater detail with respect to FIG. 1B.

At step 111 of FIG. 1A one or more query fragments are generated by parsing the search query based at least in part on one or more decomposition rules. This step is discussed in greater detail with respect to FIGS. 1B, 2, and 6. As discussed further below with reference to those figures, this search query decomposition process can be performed as part of a category determination process and/or as part of a filter extraction and generation process.

At step 112 of FIG. 1A a category corresponding to the search query is determined based at least in part on one or more of: the one or more query fragments or a distribution of search results when the search query is executed on one or more databases. Determining a category corresponding to the search query can include determining a decomposition category corresponding to the search query based at least in part on the one or more query fragments. The process for determining a decomposition category can include (1) mapping at least one query fragment in the one or more query fragments to at least one candidate decomposition category based at least in part on one or more category indicators corresponding to one or more decomposition categories and one or more category-comparison rules and (2) determining the decomposition category based at least in part on the at least one candidate decomposition category and one or more category-determination rules. Additionally, the step of mapping at least one query fragment in the one or more query fragments to at least one candidate decomposition category can include (1) mapping the at least one query fragment to at least one canonical fragment based at least in part on one or more secondary decomposition rules and one or more canonical term dictionaries and (2) mapping the at least one canonical fragment to the at least one candidate decomposition category based at least in part on the one or more category indicators corresponding to one or more decomposition categories and the one or more category-comparison rules. The process for determining a decomposition category is described in greater detail with reference to FIG. 2.

Determining a category corresponding to the search query can also include determining a preponderance category corresponding to the search query based at least in part on a distribution of search results when the search query is executed on one or more databases. Determining a preponderance category corresponding to the search query can include (1) executing the search query on the one or more databases to generate one or more results, (2) grouping the one or more results into one or more candidate preponderance categories in a plurality of preponderance categories based at least in part on one or more preponderance-matching rules, and (3) determining the preponderance category based at least in part on the one or more candidate preponderance categories and one or more rank-ordering rules. The process for determining a preponderance category is described in greater detail with reference to FIG. 3.

Determining a category corresponding to the search query can also include determining the category corresponding to the search query based at least in part on one or more of the decomposition category and the preponderance category. This process is described in greater detail with reference to FIGS. 1B and 4.

At step 113 of FIG. 1A one or more filters applicable to the search query and one or more core search terms applicable to the search query are determined based at least in part on the determined category and the one or more query fragments. Each filter in the one or more filters corresponds to a query fragment in the one or more query fragments. The step of determining one or more filters applicable to the search query and one or more core search terms applicable to the search query can include (1) identifying a plurality of filters corresponding the determined category based at least in part on one or more filter-extraction rules, (2) mapping at least one query fragment in the one or more query fragments to at least one corresponding filter in the plurality of filters based at least in part on a comparison between the at least one query fragment and one or more attributes of the plurality of filters, and (3) mapping any remaining query fragments in the one or more query fragments to the one or more core search terms.

The process of mapping at least one query fragment in the one or more query fragments to at least one corresponding filter in the plurality of filters can include (1) for each filter in the plurality of filters, comparing the at least one query fragment to one or more raw filter attributes of the filter, (2) identifying at least one filter in the plurality of filters having a raw filter attribute which matches the at least one query fragment, and (3) mapping the at least one query fragment to the identified at least one filter.

The process of mapping any remaining query fragments in the one or more query fragments to the one or more core search terms can include (1) identifying any query fragments in the one or more query fragments that are not mapped to any filters in the plurality of filters, (2) setting the one or more core search terms to the identified query fragments when a quantity of identified query fragments is greater than zero, and (3) setting the one or more core search terms to a null value when a quantity of identified query fragments is zero.

Figure 1B:
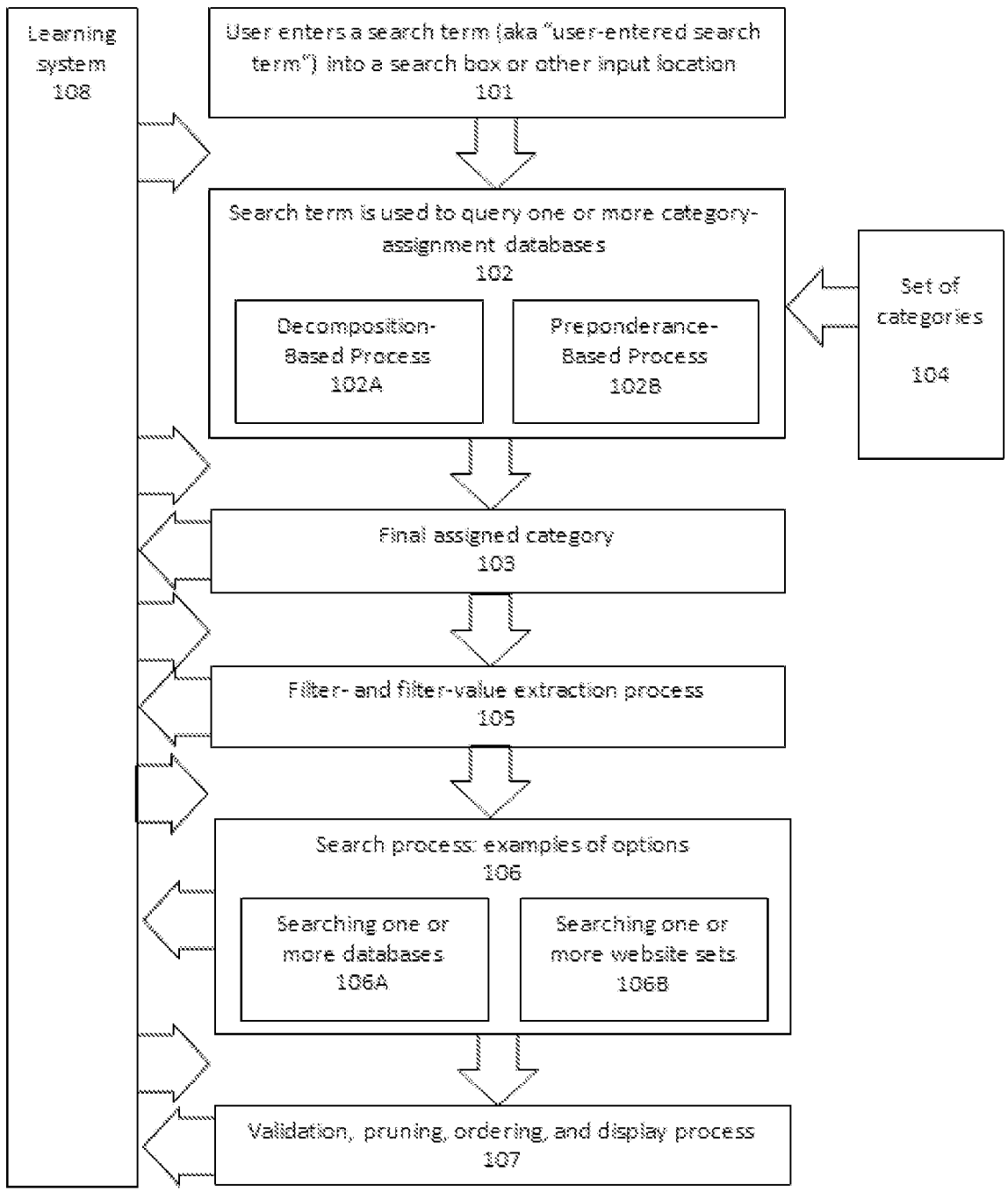
Figure 6:
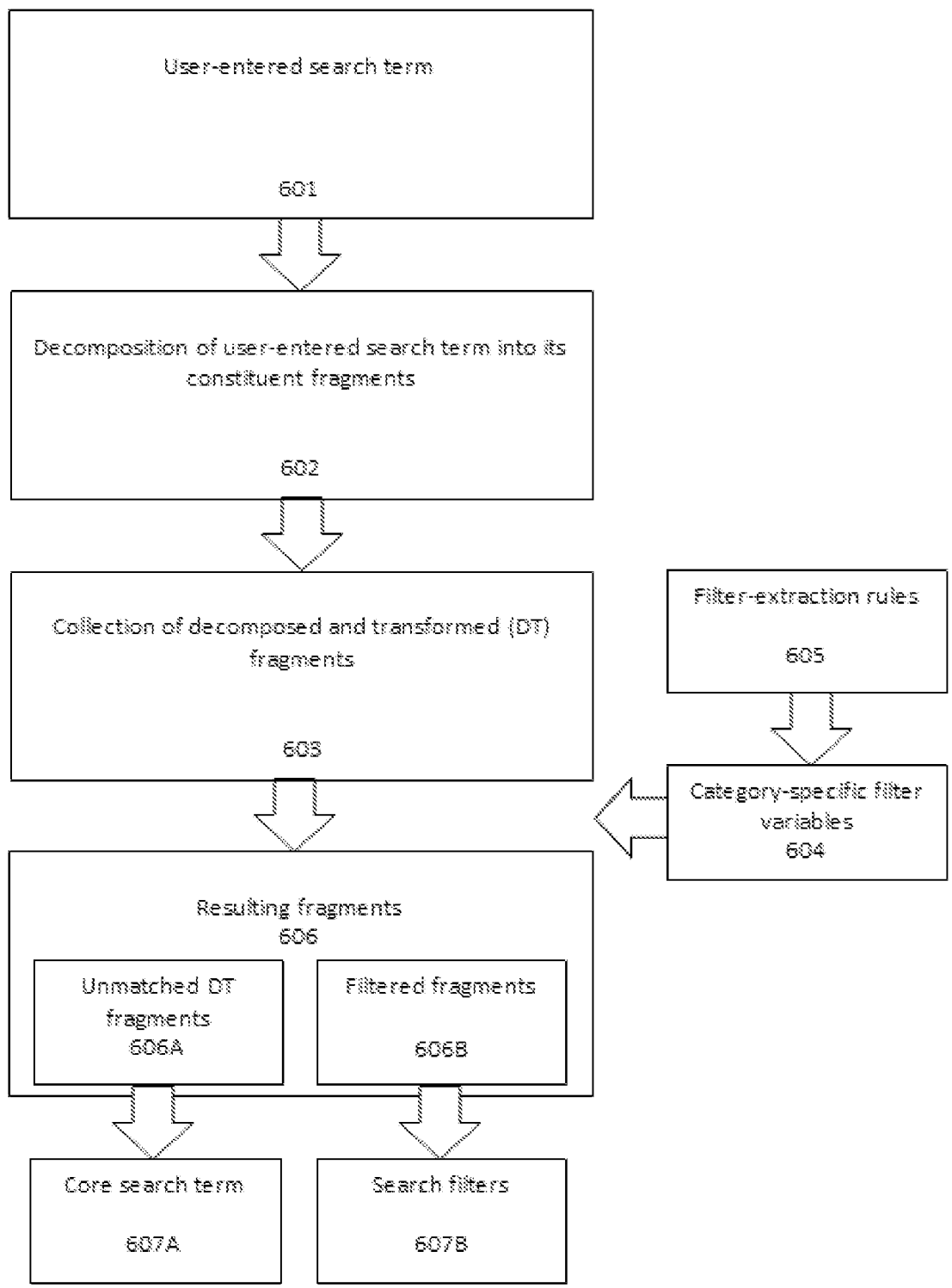
FIG. 6 illustrates details of the filter-extraction process, according to an exemplary embodiment.

The step of determining one or more filters applicable to the search query and one or more core search terms applicable to the search query is described in greater detail with respect to FIGS. 1B and 6.

At step 114 of FIG. 1A at least one custom query for at least one target database in the one or more target databases is determined based at least in part on the one or more filters, the one or more core search terms, the determined category, and one or more attributes of the at least one target database. Each custom query defines at least one filter specific to each target database and at least one category specific each target database.

The step of determining at least one custom query for at least one target database in the one or more target databases can include (1) determining at least one final filter from the one or more filters based at least in part on at least one of the one or more attributes of the target database, (2) updating the one or more core search terms based at least in part on any filters in the one or more filters which are not included in the at least one final filter, (3) determining at least one target database filter corresponding to the at least one final filter based at least in part on at least one of the one or more attributes of the target database, (4) determining at least one target database filter search range corresponding to the at least target database filter based at least in part on at least one of the one or more attributes of the target database, (5) determining at least one target database category and at least one target database category range corresponding to the determined category based at least in part on at least one of the one or more attributes of the target database, and (6) generating the at least one custom query based at least in part on the updated one or more core search terms, the at least one target database filter, the at least one target database filter search range, the at least one target database category, and the at least one target database category range. The step of determining at least one custom query for at least one target database in the one or more target databases is described in greater detail with respect to FIGS. 1B and 7-8.

At step 115 of FIG. 1A the at least one custom query is executed on the at least one target database to generate a set of search results. The target database can be any type of database, such as a database of items, information, or content. The target database can also be a website which includes a number webpages within the website. Additionally, the target database can be a database of websites, such as the index of a search engine, which stores references to additional websites. Furthermore, at least one target database can include multiple target databases of different types. For example, the multiple target databases can include a website of an online retailer which includes web pages corresponding to individual items, as well as a video database of video clips. Many variations of the at least one target database are possible and these examples are not intended to be limiting.

As discuss above, at least one target database can include at least one website. In this case, the step of executing the at least one custom query on the at least one target database to generate a set of search results can include, for each website in the at least one website, (1) retrieving a Uniform Resource Locator (URL) corresponding to a search page of the website, (2) generating at least one custom URL corresponding to the website based at least in part on the retrieved URL, the at least one filter defined in the custom query, and the at least one category defined in the custom query, (3) interrogating the website using the at least one custom URL to generate at least one group of search results, and (4) aggregating the at least one group of search results into the set of search results.

The process of generating at least one custom URL corresponding to the website based at least in part on the retrieved URL, the at least one filter defined in the custom query, and the at least one category defined in the custom query can include (1) identifying at least one category URL which corresponds to the at least one category defined in the custom query and which corresponds to the website, (2) searching a collection of filter codes to identify at least one filter code which corresponds to the at least one filter defined in the custom query and which is recognized by the website, (3) searching a collection of filter value codes to identify at least one filter value code which corresponds to at least one filter value defined in the custom query and which is recognized by the website, and (4) generating the at least one custom URL based at least in part on the at least one category URL, the identified at least one filter code, and the identified at least one filter value code.

The process of aggregating the at least one group of search results into the set of search results can include (1) determining a distribution of search results in each group of search results in the least one group of search results, (2) pruning the at least one group of search results based at least in part on the determined distribution, and (3) sorting the pruned at least one group of search results based at least in part on one or more sorting criteria.

The step of executing the at least one custom query on the at least one target database to generate a set of search results is described in greater detail with reference to FIGS. 1B and 8-11.

The process shown in FIG. 1A can additionally include feedback loop and learning system which (1) stores the information generated during one or more of: a category determination process, a filter determination process, or a search results generation process (such as those described in previous steps) and (2) utilizes the stored information for one or more of: a subsequent category determination process, a subsequent filter determination process, or a subsequent search results generation process. The feedback loop and learning system are described in greater detail with reference to FIGS. 1B and 12.

FIG. 1B illustrates another flowchart for generating categorical and criterion-based search results from a search query according to an exemplary embodiment. This illustrative search is shown with reference to a product search, but the same method can be used for a service, website links, news, information, images, videos, and/or other type of search as well. At step 101, a search term (used interchangeably with the "user-entered search term" or "search query") is entered by a user into a search box or other input location. The search term can be of either a very general nature (e.g., "shoes"), a highly-parameterized nature (e.g., "men's black Florsheim loafers, size 10), something in between (e.g., "men's black loafers"), or of any other format including one or more words and/or numbers of any identity, type, subject matter, or language.

In step 102 of FIG. 1B, the search term is used to query one or more category-assignment databases that can include one or more category-assignment processes. This query takes place according to one or more methods, two of which are shown in Step 102. Box 102A represents one or more decomposition-based processes, while Box 102B represents one or more preponderance-based processes. The meaning of the phrases "decomposition-based" and "preponderance-based" will become clear in what follows. Box 103 represents the output of this category-assignment process, containing the final assigned category for the user-entered search term.

FIG. 1B is illustrated so as to make it appear that the two sets of processes are undertaken simultaneously. In fact, in the case of two sets of processes, these two sets of processes can take place simultaneously, or one or the other can take place either wholly or in part before the other. In the case of more than two sets of processes, the more than two sets of processes can take place in any order with any degree of overlap. In the case of one set of processes, the issues of order and overlap are of course moot.

Regardless of the topology of the sets of processes, this query is employed to assign the user-entered search term to a particular information category (for example, this information category can be a product category or any type of category). The category can be at any level of detail and granularity, ranging from the highly general (e.g., "clothing accessories") to the moderately specific (e.g., "shoes") to the more specific (e.g., "men's dress and casual shoes") or anything similar. Categories can be created in a parallel, hierarchical, or any other organizational manner, and can overlap or not overlap. The number, nature, structure, and content of the categories are independent of any category-assignment database(s) or category-assignment process(es) themselves, such that one or more category-assignment databases and/or one or more category-assignment processes can be governed by any combination of number, nature, structure, and content and are in no way limited to a specific type of combination or set(s) of types or combinations of these parameters. For these reasons, the words "category" or "categories" in what follows should be interpreted to include subcategories, sub-subcategories, super-categories, or any other hierarchical category format or structure.

An illustrative set of categories is depicted in Box 104. This set of categories can be exogenously determined or determined within the system. The set of categories and can be determined automatically and/or manually. This set of categories is used as an input for the category-assignment function and is therefore employed for operations that take place during the category-assignment process(es) just described that require the definition of a set of categories, as well as any or all operations and/or processes that take place subsequently in FIG. 1B or in the more detail processes described in later figures.

Figure 2:
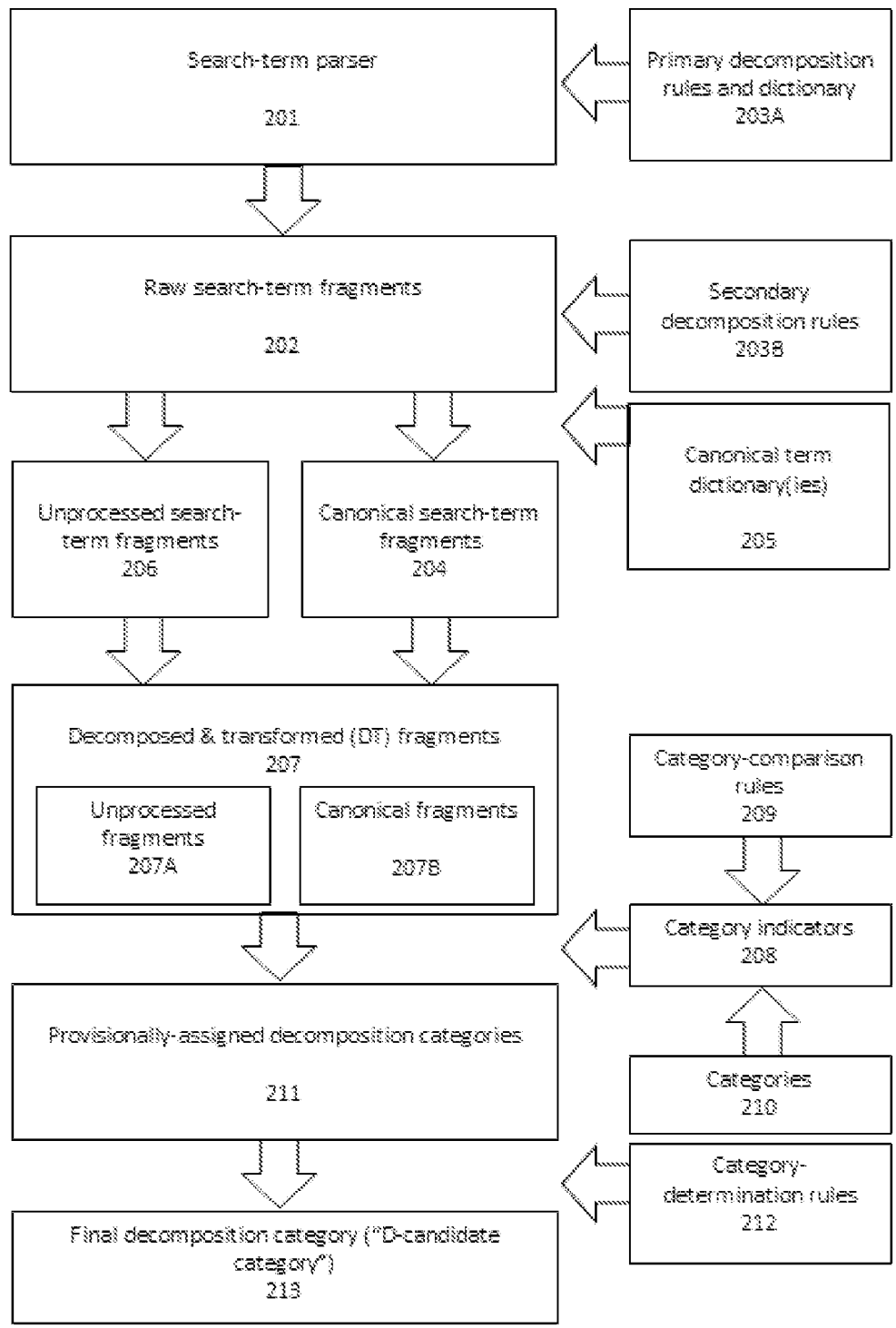
FIG. 2 illustrates one or more decomposition-based category-assignment database(s) and/or decomposition-based process(es) along with one or more elements of such process(es) according to an exemplary embodiment.

FIG. 2 depicts an exemplary embodiment of one or more decomposition-based category-assignment database(s) and/or decomposition-based process(es) along with one or more elements of such process(es), which is/are the process(es) depicted in Box 102A in FIG. 1B. Note that the decomposition-based category-assignment database(s) and/or decomposition-based category-assignment process(es) can include all or only one or more of these elements, and can include one or more other related elements not described here. The specific functions of these elements, as described in what follows, are illustrative only, and individual elements can have varying relevant functions other than those described here. The ordering of the specific functions described here is also illustrative, and alternative orderings are included by reference in the description of the decomposition-based category-assignment database(s) and/or decomposition-based process(es) that follow.

Box 201 of FIG. 2 shows an exemplary search-term parser that decomposes the search term into various raw search-term fragments, a collection of which is shown in Box 202, each of which can be comprised of one or more individual words. This decomposition takes place first according to a set of one or more primary decomposition rules and one or more accompanying term dictionaries, as displayed in Box 203A. These rules and the accompanying dictionary(ies) include specific scenarios, word classes, or other phrase-related instructions for carrying out the decomposition. For example, the rules can include a condition that when the word "size" is followed by a number, such as "10," the two words are to be passed through the parser as a single fragment, that is, "size 10." Any number of decomposition rules can be included within set of rules.

The various raw fragments in Box 202 are then transformed, where possible, according to a set of one or more secondary decomposition rules 203B and one or more accompanying canonical term dictionaries, as shown in Box 205, into a set of canonical search-term fragments, as depicted in Box 204. These canonical fragments are words or phrases that have been normalized by association with members of a pre-existing canonical phrase list, as displayed in Box 205. For instance, by way of illustration, the decomposition process that produces the set of raw fragments shown in Box 202 might, at various times, yield such individual raw fragments as "men's," "man's," "guy's," and "young man's"). When any of these raw fragments are compared against the canonical phrase list, they can be associated with and replaced by the respective canonical phrase, which in this illustrative instance can be "male." In this way, one or more raw fragments can be transformed into respective canonical fragments, with which they have a one-to-one correspondence. Those raw fragments from Box 202 that find no association in the canonical phrase list are passed on to a set of unprocessed fragments, as shown in Box 206, which are identical to their corresponding raw fragments.

In this illustration, there is no overlap between the canonical fragments in Box 204 and the unprocessed fragments in Box 206 (that is, the two sets of fragments are mutually exclusive), and these two sets of fragments fully account for all of the fragments in the original set of raw fragments in Box 202 (that is, the two sets of fragments are exhaustive). However, it is also possible that there can be overlaps among the two sets of fragments, and/or that the two sets of fragments cannot fully account for all of the fragments in the original set of raw fragments. In any event, regardless of the relationships among the two sets of fragments, the canonical fragments in Box 204 combined with the unprocessed fragments in Box 206, taken together, comprise the superset of decomposed and transformed (DT) fragments, as shown in Box 207. These sets of fragments, while combined, maintain their own identity, and are segregated into Box 207A (unprocessed fragments) and Box 207B (canonical fragments)

Each member of the set of DT fragments shown in Box 207 is then compared against one or more sets of category indicators, as depicted in Box 208, guided by one or more sets of category-comparison rules, as shown in Box 209. Each of the sets of category indicators includes one or more words and/or phrases (or one or more combinations of words and/or phrases), collectively called "characteristic phrases." Each individual or group of these characteristic phrases is associated with one or more specific categories from Box 210 (which is the same as Box 104). The category-comparison rules can be category-specific (see the illustrative example below), and/or they can apply more generally, across a plurality of categories. For instance, in the latter circumstance, by way of illustration, a general category-comparison rule might govern the handling of plurals, misspellings, and multiple matches.

During the comparison process, when a DT fragment matches a given category indicator's characteristic phrase, the category associated with that characteristic phrase becomes the given DT fragment's "provisionally-assigned decomposition category," also referred to as a "candidate decomposition category." This process continues until all of the DT fragments have been examined and, where possible, assigned a "provisionally-assigned decomposition category." The set of all provisionally-assigned decomposition categories, so assigned, are collected in Box 211. DT fragments that do not match a characteristic phrase are ignored throughout the remainder of the category-assignment process.

By way of illustrating the use of the category indicators, assume that one of the DT fragments in Box 207 is "boot." If in a particular set of category indicators, the DT fragment "boot" matches the characteristic phrase "boot" and that characteristic phrase "boot" is associated with the category "shoes," then "shoes" becomes the provisionally-assigned decomposition category for the DT fragment "boot."

By way of now illustrating the use of the category-comparison rules in this matching process—and continuing the above example—assume that there is a category-comparison rule that declares that the word "boot" to be assigned to the category "shoes," unless the original user-entered search term in Box 101 also contains one or more fragments related to automobiles (e.g., "parts") or computers (e.g., "disk"), in which case the rule can require that "the DT fragment boot" be given a different provisionally-assigned decomposition category. As illustrated above, the category-comparison rules can utilize words or fragments in the search query other than the DT fragment (query fragment) which is being compared to decomposition categories in order to identify a decomposition category corresponding to a particular query fragment.

For reasons of accuracy, efficiency, or otherwise, the process described above also can be carried out by using only the canonical fragments 207B, rather than the entire set of DT fragments 207.

As indicated, this category-comparison process takes place for each of the members of the set of DT fragments for a given user-entered search term. The output of this process will be one or more provisionally-assigned decomposition categories (or no provisionally-assigned decomposition categories) for each DT fragment, the group of which provisionally-assigned decomposition categories, as noted, is collected in Box 211.

The category-determination rules in Box 212 determine how the group of provisionally-assigned decomposition categories in Box 211 is converted into a single provisionally-assigned decomposition category, which will be passed to Box 213 and which is discussed in greater detail below. (1) If no provisionally-assigned decomposition categories are present in Box 211, then the decomposition-based category-assignment process(es) stop, and a null value is passed to Box 213. (2) If only one provisionally-assigned decomposition category is present in Box 211, then that category is automatically passed to Box 213. (3) If two or more provisionally-assigned decomposition categories are present in Box 211, then one or more sets of category-determination rules in Box 212 determine which, if any, of these provisionally-assigned decomposition categories—or an alternative provisionally-assigned decomposition category—should be passed to Box 213.

If the ultimate result of the foregoing is the passing of a provisionally-assigned decomposition category from Box 211 to Box 213, the category so passed becomes the "final decomposition category" or the "D-candidate category" for the user-entered search term (where the "D" refers to the category as having been the result of the decomposition process). If no provisionally-assigned decomposition category is passed from Box 211 to Box 213, then the D-candidate category has a null value. Whichever outcome takes place becomes the final output of the decomposition-based category-assignment process(es).

To illustrate this process of decomposition-based category comparison and assignment with an example, assume that the search term entered in step 101 is "men's black loafers." Assume further that the category-assignment process(es) yield the following provisionally-assigned decomposition categories: (1) for the fragment "men's," "men's apparel and accessories"; (2) for the fragment "black," no provisionally-assigned decomposition category; and (3) for the fragment "loafers," "shoes." In this process, two provisionally-assigned decomposition categories result, which invokes the procedure described above for two or more provisionally-assigned decomposition categories, which requires the application of one or more category-prioritization rules from step 214. Assume that the application of one or more category-prioritization rules results in a category that represents neither individual provisionally-assigned decomposition category, but an alternative to them, and assume that the resulting category is "men's shoes." This latter category thereby becomes the final decomposition category (D-candidate category) in this example, which is contained in Box 213. In this particular example, the final decomposition category is determined based on the candidate decomposition categories but is not one of the candidate decomposition categories. In other examples, the final decomposition category can be selected from the pool of candidate decomposition categories.

Figure 3:
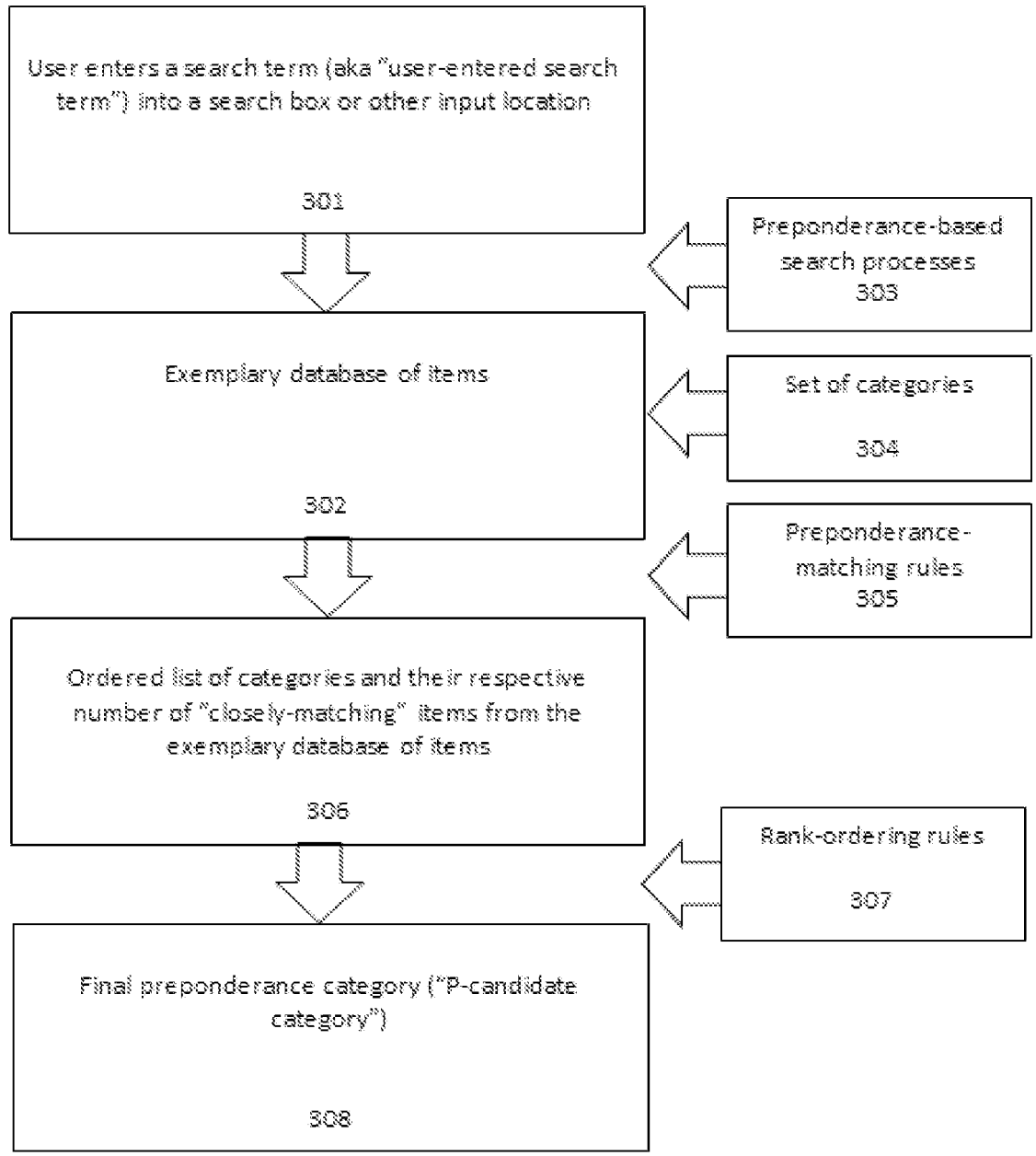
FIG. 3 illustrates one or more preponderance-based category-assignment database(s) and/or preponderance-based process(es) along with one or more elements of such process(es) according to an exemplary embodiment.

FIG. 3 depicts an exemplary embodiment of one or more preponderance-based category-assignment database(s) and/or preponderance-based process(es) along with one or more elements of such process(es), which is/are the process(es) depicted in Box 102B in FIG. 1. As noted above, the execution of the preponderance-based process(es) can take place prior to, after, or simultaneous with the execution of the decomposition-based process(es).

As with the decomposition-based category-assignment database(s) and/or decomposition-based category-assignment process(es) described earlier, the preponderance-based category-assignment database(s) and/or preponderance-based process(es) can include all or only one or more of these elements, and can include one or more other related elements not described here. As also with respect to the decomposition-based category-assignment database(s) and/or category-assignment process(es) described earlier, the specific functions of these elements, as described in what follows, are illustrative only, and individual elements can have varying relevant functions other than those described here. The ordering of the specific functions described here is also illustrative, and alternative orderings are included by reference in the description of the preponderance-based category-assignment database(s) and preponderance-based process(es) that follow.

Box 302 of FIG. 3 shows an exemplary database of items, which can include but is not limited to products, services, pieces of news or information, websites, web applications, mobile applications, images, and/or videos. Box 302 can represent a single database or a plurality of databases, either or similar or dissimilar type, structure, and/or content. The items can be of the same type or of a different type, and there can be any number of items and/or any number of types of items in the database. Each of these items has been previously associated in the illustrative database with one or more categories from among the categories listed in Box 304, which is the same as Box 104 in FIG. 1.

In Step 301, the search term from Step 101 is used to query the exemplary database in Box 302 using one or more appropriate preponderance-based search methods and/or processes, as shown in Box 303, in order to search for items in the database. The items are related to, associated with, and/or grouped into the categories 304 based on preponderance matching rules 305 and/or preponderance-based search process(es). The specific identity and/or nature of the search process(es) used is not material to the manner of the subsequent execution of the preponderance-based category-assignment process(es).

Regardless of the nature of specific of the preponderance-based search process(es) employed, the output of the search process(es), as depicted in Box 306, is an ordered list of categories and the number of items (in the illustrative case, products) closely matching each of the listed categories (where "closely matching" is operationally defined by the manner of execution of each specific preponderance-based search process(es) 303 that were employed, as well as one or more sets of general and/or term- or category-specific "preponderance-matching rules," as shown in Box 305). The number of categories on any given ordered category list can be 0 to N, where N is some number of any value zero or greater. The categories are listed in order of preponderance, with the category, if any, with the most closely-matching items being listed first, the category, if any, with the second-most closely-matching items being listed second, and so on. These categories are also referred to herein as candidate preponderance categories.

To illustrate this category-listing process with an example, assume that the user in Step 301 enters the search term "men's black loafers." Assume further that the ordered list of categories and their respective number of closely-matching items 306 resulting from the applied preponderance-based search process 303 includes these entries: (1) "shoes," 431 matches; (2) "men's shoes," 291 matches; (3) "men's dress and casual shoes," 204 matches; (4) "men's apparel and accessories," 129 matches; and (5) men's athletic shoes, 43 matches.

One or more sets of "rank-ordering rules," as shown in Box 307, are applied to determine whether the category that is listed first on the ordered category list from Box 306—or some other category, or no category—is passed to Box 308, and is denoted as the P-candidate category, where "P" stands for "preponderance." In the example just cited, the category that is listed first is "shoes." That category is then passed to Box 304, and becomes the P-candidate category.

Figure 4:
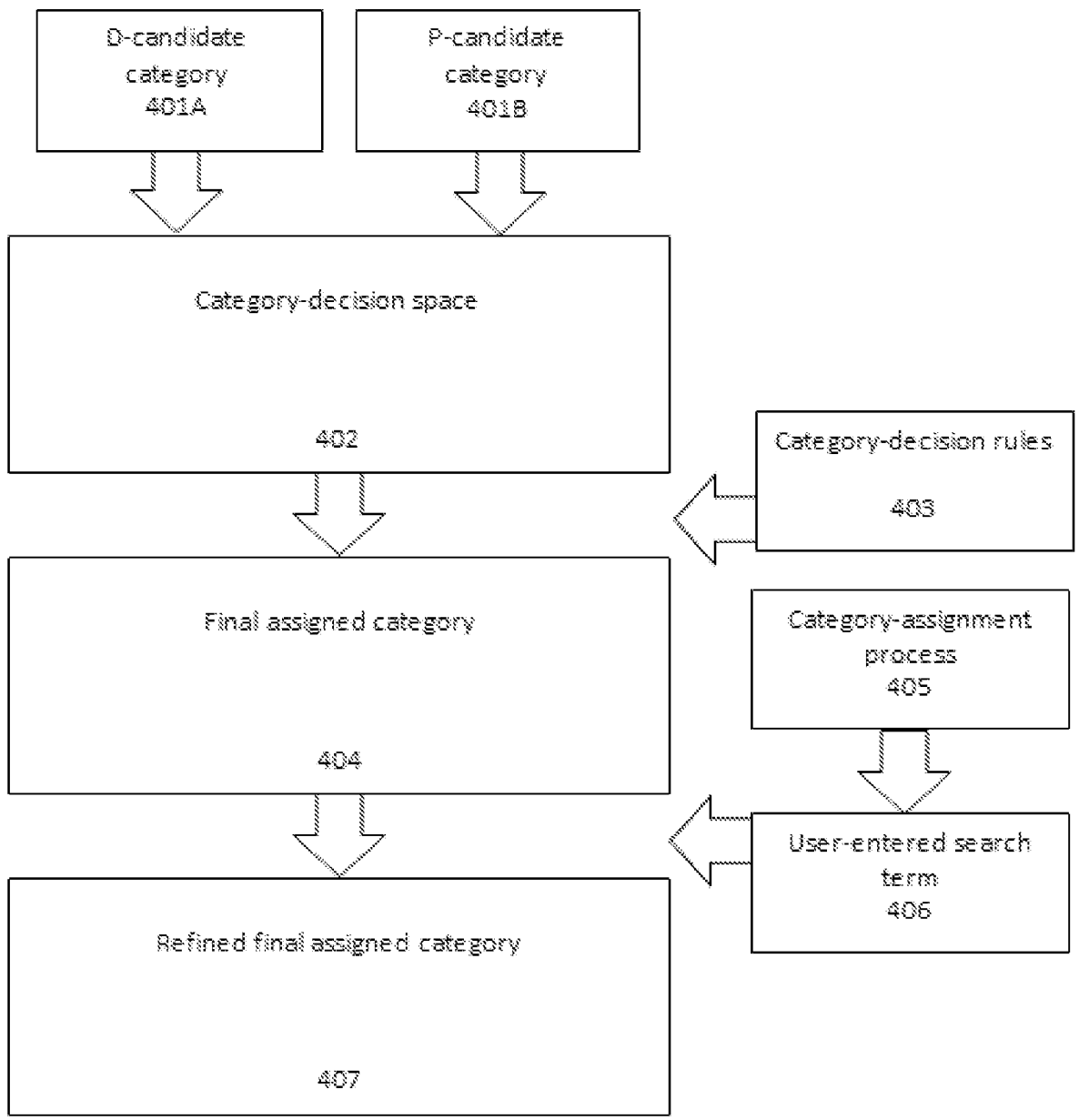
FIG. 4 illustrates a category-decision process, including one or more category candidates (inputs), one or more category-decision rules, and a category-decision space according to an exemplary embodiment.

FIG. 4 presents an exemplary embodiment of a category-decision process, including one or more category candidates (inputs), one or more category-decision rules, and a category-decision space. If there is only one category-candidate input, then the decision is trivial, and the output of the category-decision process is equivalent to the single category-candidate input. Otherwise, the category-decision process begins with a plurality of category-candidate inputs. The actual number of inputs can be anywhere from one to N, where N is an arbitrary number.

In the case of the ongoing example, which represents one of any number of possibilities and any number of inputs, there are two category-candidate inputs: the D-candidate category and the P-candidate category, represented, respectively, by Box 401A (which is equivalent to Box 213 in FIG. 2) and by Box 401B (which is equivalent to Box 308 in FIG. 3). These category-candidate inputs are passed to the category-decision space (Box 402), and are therein acted upon by one or more sets of category-decision rules of any type and nature (Box 403), which interaction produces a final assigned category (Box 404) for the user-entered search term. Box 404 is equivalent to Box 103 in FIG. 1.

To illustrate this process with a example, assume that the D-candidate category in Box 401A (as illustrated before) is "men's shoes" and that the P-candidate category in Box 401B (as also illustrated before) is "shoes." Assume further that these two inputs are acted upon by a rule that, if two candidate categories have the same core (in this case, "shoes"), but if one is acted upon by a gender modifier (in this case, "men's"), then the output will be the candidate category that contains the gender modifier (in this case, "men's shoes").

If desired, parts of all of the elements of the category-assignment process just described (including, without limitation, elements of the decomposition and/or preponderance processes), as shown in Box 405, can be applied again to the user-entered search term 406 in order to produce a more refined final assigned category, as shown in Box 407, by employing one or more decomposition and/or preponderance method(s) and/or process(es) more specific to the final assigned category. The more refined final assigned category can be, for example, a subcategory of the original final assigned category. Alternatively, the more final refined category can be a different category that is not a subcategory of the original final assigned category.

If the category-assignment process is repeated, in part or in whole, then one or more categories associated with the original final assigned category can be supplied to the processes described in FIGS. 2-3. The one or more categories associated with the original final assigned category can be categories which are similar to the original final assigned category, categories which have overlap with the original final assigned category, and/or categories which are subcategories of the original final assigned category. The one or more categories associated with the original final assigned category can be determined using one or more of keyword matching, relevancy metrics, index lookup, or other techniques. When the category-assignment process is repeated, the one or more categories associated with the original final assigned category can be provided in step 210 of FIG. 2 and/or can step 304 of FIG. 3.

To illustrate, by way of continuing the example discussed earlier, assume that the final assigned category for the user-entered search term is "shoes." Once within that category, decomposition and/or preponderance method(s) or process(es) can be applied to assign the user-entered search term to the more refined final assigned categories of "dress+boots" or "winter boots" or some other relevant term, depending upon the criteria entered as part of the user-entered search term. For instance, if instead of "boot," the user-entered search term were "snow boot," then the re-application of the category-assignment process might result in a refined final assigned category of "winter boots."

Figure 5:
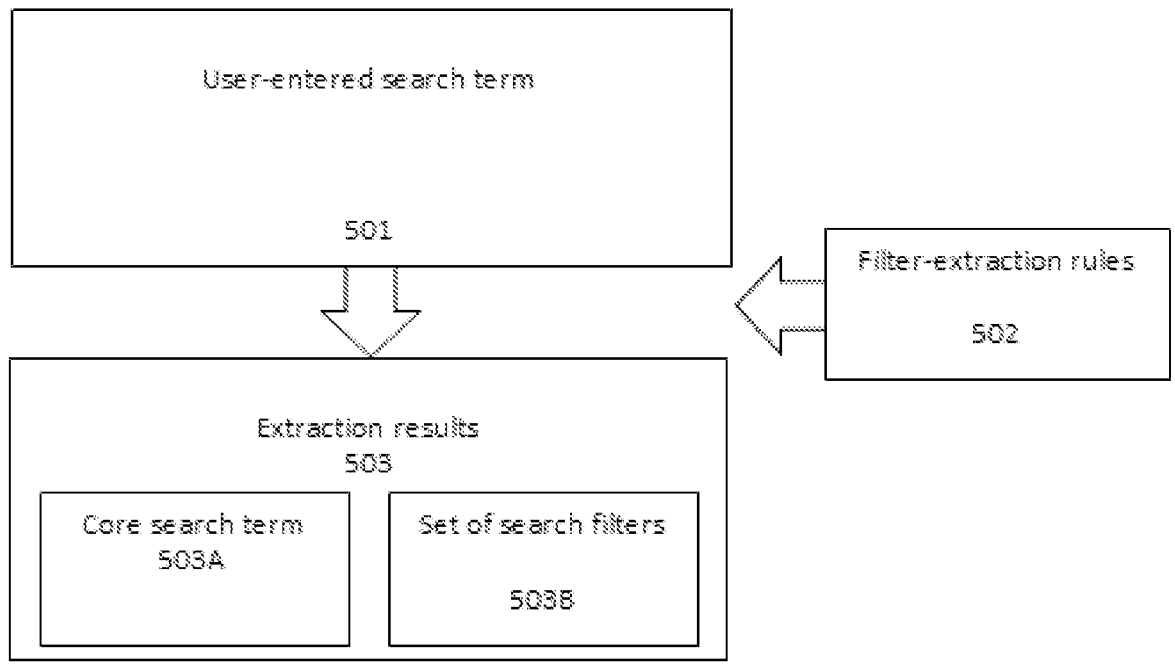
FIG. 5 illustrates a filter-extraction process according to an exemplary embodiment.

Returning to FIG. 1, once the final assigned category (Box 103 or Box 404) has been determined, a filter-extraction process, depicted in Box 105, takes place, in which one or more sets of general and/or category-specific filter-extraction rules are employed to extract the zero, one, or more general and/or category-specific attribute types ("filters") and the associated filter values that are criteria input as part of the user-entered search term. This process is detailed in FIG. 5, which shows the user-entered search term (Box 501, which is equivalent to the search term entered in Step 101 of FIG. 1) being acted upon by one or more sets of general and/or category-specific filter-extraction rules (Box 502). This filter-extraction process results in the decomposition of the user-entered search term into a set of extraction results (Box 503), including but not necessarily limited to: (1) a core search term (Box 503A), which can be a null value; and (2) zero, one, or more search filters, each with a respective filter value (represented collectively in Box 503B).

To illustrate this process by way of an example, assume that the user-entered search term in Box 501 is "men's black Florsheim loafers." Once a set of category-specific filter-extraction rules (Box 502) are applied, the filter-extraction process results in the decomposition of the user-entered search term into the core search term "loafers" (Box 503A) and three search filters (Box 503B), including: (1) "gender" (Filter 1)="men's" (Filter 1 value); (2) "color" (Filter 2)="black" (Filter 2 value); and (3) "brand" (Filter 3)="Florsheim" (Filter 3 value).

FIG. 6 presents the details of this exemplary filter-extraction process. At step 601, the user-entered search term from step 101 is received and, at step 602, it is decomposed into its constituent fragments. The output of this decomposition (Box 603) is the collection of DT fragments from Box 207, such that Box 603 is equivalent to Box 207.

There are two possible circumstances at this stage of the filter-extraction process. (1) If the decomposition process depicted in FIG. 2 (Boxes 201 through 207) already has taken place, then the output of that process (Box 207) is passed directly (via step 602) to Box 603. In this case, step 602 includes the action of transferring information. (2) On the other hand, if the decomposition process depicted in FIG. 2 (Boxes 201 through 207) has not already taken place, then that decomposition process (Boxes 201 through 207) become constituent elements of step 602, and the output of that process (Box 207) is passed to Box 603. In this case, step 602 includes the full set of actions represented by Boxes 201 through 207 of FIG. 2.

Regardless of which of these two circumstances prevail, once the collection of one or more DT fragments has been entered into the filter-extraction process at Box 603, each of these DT fragments are individually compared against one or more sets of lists of category-specific filter-class variables (Box 604), applying one or more sets of zero, one, or more general- and/or category-specific filter-extraction rules (Box 605, equivalent to Box 502). Each filter variable in Box 604 includes one or more of the following four parts: (1) an alphanumeric or other form of unique identifier; (2) a raw filter value; (3) its associated filter class; and (4) its canonical, or standardized, filter value.

To illustrate the composition of a filter variable by way of a example, a certain category-specific filter variable might consist of these four parts: (1) "AB1106" as the identifier; (2) "dark blue" as the raw filter value; (3) "color" as the associated filter class; and (4) "blue" as the canonical filter value. The canonical filter value can be the same as the raw filter value for any given filter variable or can be a different value from raw filter value. Note that other raw filter values, such as "light blue," "azure," "navy," "midnight blue," and/or others might also be assigned to the same canonical filter value "blue."

During the comparison process between the DT fragments in Box 603 and the one or more sets of lists of category-specific filter-class variables in Box 604, any matches between a given DT fragment and the raw filter value of a given filter-class variable—with the nature and validity of the match determined by the associated one, or more general- and/or category-specific filter-extraction rules in Box 605—transform the DT fragment into a "filtered fragment," which then assumes the identity of the canonical filter value of the filter value whose raw filter value it matches. These filtered fragments, if any, are collected in Box 606B, and the remaining, unmatched DT fragments, if any, are collected in Box 606A. Collectively, these sets are referred to as the "resultant fragments" (Box 606).

The filtered fragments 606B, if any, are collected as search filters in Box 607B (the same as Box 503B in in FIG. 5), while the remaining, unmatched DT fragments 606A are concatenated and combined into the core search term in Box 607A. Each search filter includes three parts: (1) unique identifier; (2) filter class; and (3) filter value, which are the same, respectively, as the filter-class variable's: (1) unique identifier; (2) filter class; and (3) canonical filter value. Values of the core search term and search filters were illustrated above in connection, respectively, with Boxes 503A and 503B of FIG. 5.

Collectively or individually, the original user-entered search term from Box 101, the core search term, if any, from Boxes 503A and 607A, and/or the identified search filters, if any, from Boxes 503B and 607B can be used to execute a search in a plurality of ways and in a plurality of modes against a plurality of data or information repositories. As illustrated by Boxes 106A and 106B in FIG. 1, two of these are: (1) searching one or more databases of products, services, news or information items, websites, web applications, mobile applications, images, videos, and/or other pieces of data for instances included therein that match one or more specific search terms, mediated and constrained by the extracted search filters and filter values, such that the search is carried out against only those database items whose specified search-filter values match some or all of the corresponding search-filter values of the user-entered search term; and (2) searching one or a collection of individual websites for products, services, news or information items, websites, web applications, mobile applications, images, videos, and/or other pieces of data for instances included therein that match one or more specific search terms, mediated and constrained by the extracted search filters and filter values, such that the search is carried out against only those websites or website contents whose specified search-filter values match some or all of the corresponding search-filter values of the user-entered search term. These two search methods are discussed in more detail below, but these two examples represent only two of a plurality of possible uses of this invention, and the presentation of these two examples is in no way intended to limit or restrict the employment of this or related search processes to other possible uses, settings, or implementations.

Figure 7:
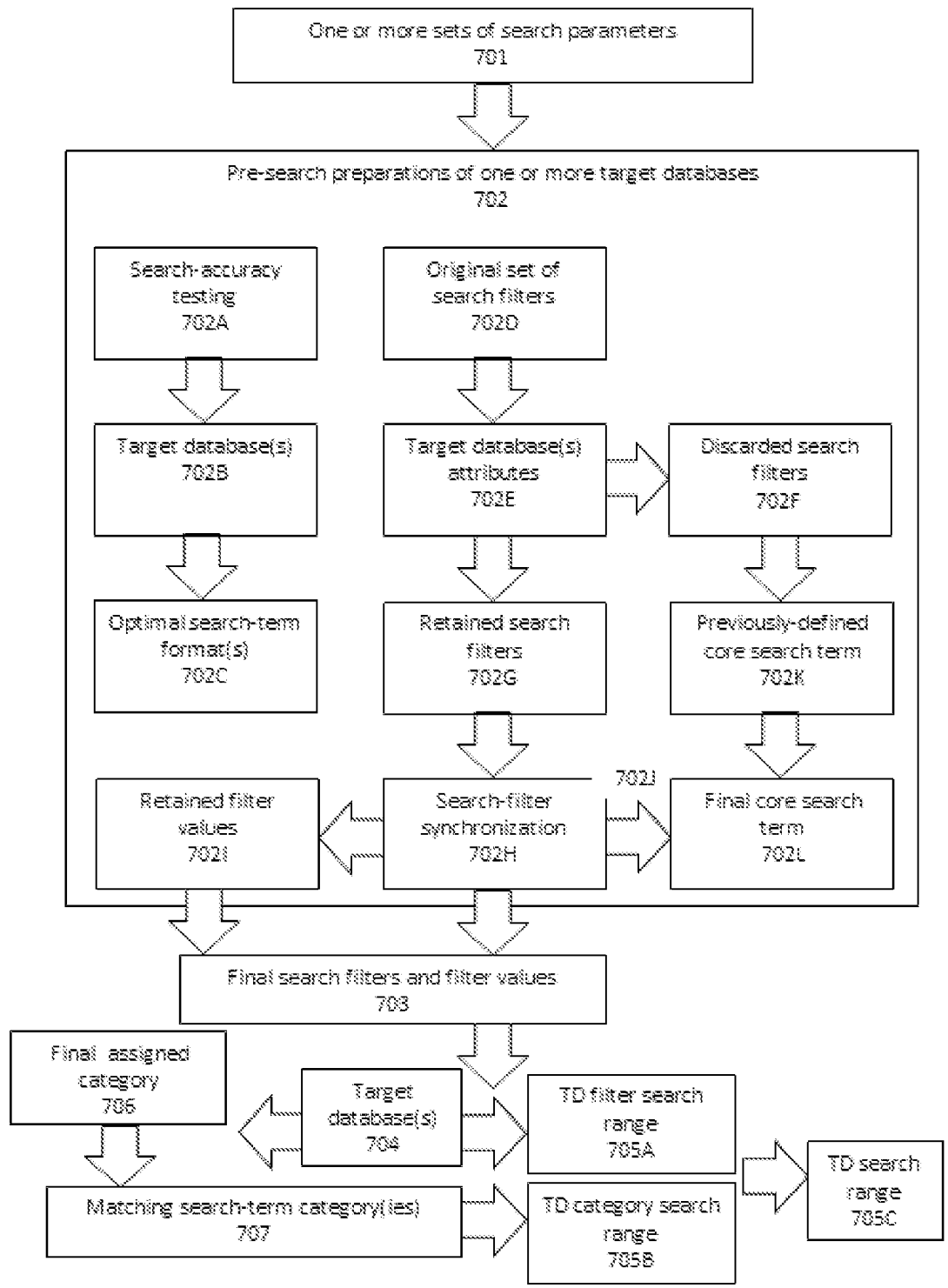
FIG. 7 illustrates an application of the search method to the process of preparing to search one or more target databases according to an exemplary embodiment.

FIG. 7 illustrates an exemplary application of this one or more filter-extraction method(s) and/or process(es) and their associated one or more search-parameter outcomes to the process of preparing to search one or more databases of products, services, news or information items, websites, web applications, mobile applications, images, videos, and/or other pieces of data for database elements included therein that match one or more specific search terms. The one or more database(s) to be searched (referred to hereinafter as the "target database(s)") are depicted in Box 704. The searches are mediated and constrained by the extracted search filters and filter values, such that the search is carried out against only those database items whose specified search-filter values match some or all of the corresponding search-filter values of the user-entered search term. By way of illustration, we will assume that a search is being undertaken against a single database, and we will further describe this process of searching such a target database with respect to a search for products. However, the search can be undertaken for any number, type, content, format, or combination of databases. This invention is intended to incorporate these and any other related search methods, modes, types, numbers, or search ranges.

The one or more target databases illustrated in this exemplary embodiment are searched using one or more sets of search parameters (for example, search filters and search-filter values), which are depicted in Box 701. These search parameters are defined, identified, and/or prepared either ahead of time, prior to conducting such a search, and/or contemporaneously with the search (step 702) for their use in searching one or more such target databases. Five examples of specific preparations of these search parameters that can be undertaken, among any number of preparation types that can be taken, are as follows: (1) A plurality of trial searches against the one or more target databases are conducted, as shown in Box 702A, with a plurality of test search terms, using any appropriate search methodology applicable to the one or more target database(s) 702B, in order to determine empirically whether searches with only a core search term, searches with broader search terms (such as for example, the original user-entered search term), or searches conducted with another search format produce more accurate search results against these particular one or more databases. The more accurate one or more search term formats resulting from these tests are referred to as the "optimal search-term format(s)," and are depicted in Box 702C. The "optimal search-term format(s)" can be uniform across search-term queries against the one or more target databases 702B, or they can be varied according to search-term category, database type, or any other criteria, any combination of criteria, or no criteria at all.

(2) The zero or more search filters in Box 702D (which are the same as the search filters in Boxes 503B and 607B), which resulted from the search-filter extraction process, are compared with the range of zero or more parameters that are separately coded as "attributes" (Box 702E) in the one or more target databases. Those search filters in Box 702D for which there is no corresponding match among the attributes 702E in the target database can be removed (the "discarded" search filters, collected in Box 702F), while the remaining search filters are retained. The "retained search filters" are collected in Box 702G.

(3) Once this comparison is complete, the retained search filters in Box 702G are synchronized in any appropriate manner with the method(s) used to query the one or more target databases so that the filter values for each respective search filter are passed directly to the one or more target databases as attribute values as part of a structured target-database query. This search-filter/attribute synchronization process is depicted in Box 702H. The result of this process is one or more sets of final search filters ("final search filters"), as depicted in Box 703.

(4) As part of the synchronization process 702H, the filter value(s) associated with each search filter in the one or more sets of final search filters are compared to their respective attribute value(s) in the one or more target databases. Any and all such filter values that have one or more matches among their corresponding attribute value(s) in the one or more target database(s) are collected in Box 702I as "retained filter values," with all other filter values set aside. The retained search filters 702G and retained filter values 702I are then collected together in a set of one or more "final search filters and filter values," as illustrated in Box 703.

(5) Any filter values associated with one or more search filters in the one or more sets of search filters that do not match corresponding attributes in the one or more target databases are set aside as "discarded filter values" and they (step 702J), along with the filter values associated with the "discarded search filters" in Box 702F, can be added back into and concatenated with the previously-defined "core search term" (Box 702K), which is the same as the "core search term" in Boxes 503A and 607A), in order to produce a "final core search term" (Box 702L).

By way of illustration, assume that the original search filters are those specified in the discussion surrounding the original introduction of Box 503B, namely: (1) gender; (2) color; and (3) brand. Assume further that the user-entered search term is "men's black Florsheim loafers." Assume further that the filter-extraction process previously undertaken yields these filter values for the user-entered search term: "gender" (Filter 1)="men's" (Filter 1 value); (2) "color" (Filter 2)="black" (Filter 2 value); and (3) "brand" (Filter 3)="Florsheim" (Filter 3 value). Assume finally that this results in a "original core search term" of "loafers."

Continuing this illustration, assume that a target database segments out attributes for "gender" and "brand," but not for "color." Hence, the search filter for "gender" will be linked directly with the target-database attribute for "gender"; the same process will be undertaken for the search filter for "brand." However, because there is no target-database attribute for "color," the search filter for "color" becomes a "discarded search filter" and removed from Box 702D, and any filter values associated with this search filter are re-entered into the previously-defined core search term 702K to produce the new core search term 702L. Thus, instead of yielding the previously-defined core search term of "loafers," decomposition of the user-entered search term "men's black Florsheim loafers" yields the new core search term of "black loafers." Likewise, the original set of search filters ("gender," "brand," and "color"), as depicted in Box 702D, are reduce to the final set of search filters ("gender," "brand"), as depicted in Box 703.

Now, further continuing this illustration, assume that, while the target database segments out an attribute for "brand," that attribute does not have among its attribute set the specific brand of "Florsheim." In that case, the filter value "Florsheim" is set aside as a "discarded filter value" 702J, and is added back into the final core search term just defined to produce the new final core search term of "black Florsheim loafers" 702L.

Once the above preparations have been completed, searches against the target database 704 are restricted as follows (the "search-restriction process"). Specifically, searches against the one or more target databases are made against only those zero or more target-database(s) elements whose attributes match the zero or more final search filters in Box 703 AND whose associated attribute values also match the respective filter values, also in Box 703, for these zero or more final search filters. This group of zero or more matching target-database(s) elements is referred to as the "target-database(s) (TD) filter search range," and is depicted in Box 705A. All target-database(s) elements that do not satisfy all of these criteria are excluded from the target-database(s) filter search range.

By way of example, this means that, if the search term is "men's black Florsheim loafers" and the correlations between filter values and target-database(s) attributes are as just described, a search against the target database would search only those target-database(s) elements that both possess "gender" and "brand" attributes and, further, possess both "men's" as their "gender" attribute and "Florsheim" as their "brand" attribute. Any other target-database(s) elements not possessing both of these attributes as well as their associated attribute values would be excluded from the target-database(s) filter search range.

One other preparation that can be undertaken, distinct from those listed above, is to correlate the user-entered search term's final assigned category in Box 706 (the same as Box 404) with any category(ies) that can exist as attributes in the one or more target databases. If the final assigned category in Box 706 matches one or more category-attributes in the one or more target databases ("matching category-attributes," as shown in Box 707), the final assigned category is linked to the matching category-attributes in the one or more target databases so that the matching category-attributes are passed through directly as attribute values in the one or more target databases, using the search-restriction method described above.

Subsequently, a search with a search term with a particular final assigned category is conducted against only those target-database(s) elements whose category-attribute value matches the user-entered search term's final assigned category. This group of zero or more matching target-database(s) elements is referred to as the "target-database(s) (TD) category search range," and is depicted in Box 705B. Target-database(s) elements whose category-attribute value does not match the search term's final assigned category are excluded from the target-database(s) category search range.

By way of illustration, assume that Box 103 contains three search-term categories: (1) dress shoes; (2) casual shoes; and (3) athletic shoes. Assume further that the target database contains two category-attribute values: (1) "dress and casual shoes"; and (2) "athletic shoes." In this illustration, execution of a search whose search term has been determined, through the category-assignment process, to belong to either the "dress shoes" category or the "casual shoes" category is undertaken against only those elements in the one or more target databases with the category-attribute value of "dress and casual shoes." Likewise, execution of a search whose search term has been determined, through the category-assignment process, to belong to the "athletic shoes" category is undertaken against only those items in the one or more target databases with the category-attribute value of "athletic shoes."

The search-filter and search-term-category matching processes can be applied separately or in conjunction, or one or both can be applied not at all. In the case of application in conjunction, both the search-filter matching process and the category-matching process limit the range of the search against the one or more target databases. Specifically, any target-database(s) elements that are not part of both the target-database(s) filter search range and the target-database(s) category search range are excluded from the search. Only those target-database(s) elements that are part of both of the aforementioned search ranges, which when combined constitute the "target-database(s) (TD) search range," are subject to the search, as depicted in Box 705C.

Continuing the illustration above, a search for "men's black Florsheim loafers" will be executed against only those elements in the one or more target databases that do all of the following: (1) possess all of the attributes of "gender," "color," and "brand"; (2) possess all of the attribute values "gender"="men's," "color"="black," and "brand"="Florsheim"; and (3) possess the category-attribute value of "dress and casual shoes." The set of target-database(s) elements satisfying all of these criteria constitute the target-database(s) search range. Any target-database(s) elements that do not satisfy all of these criteria will be excluded from the target-database(s) search range.

Figure 8:
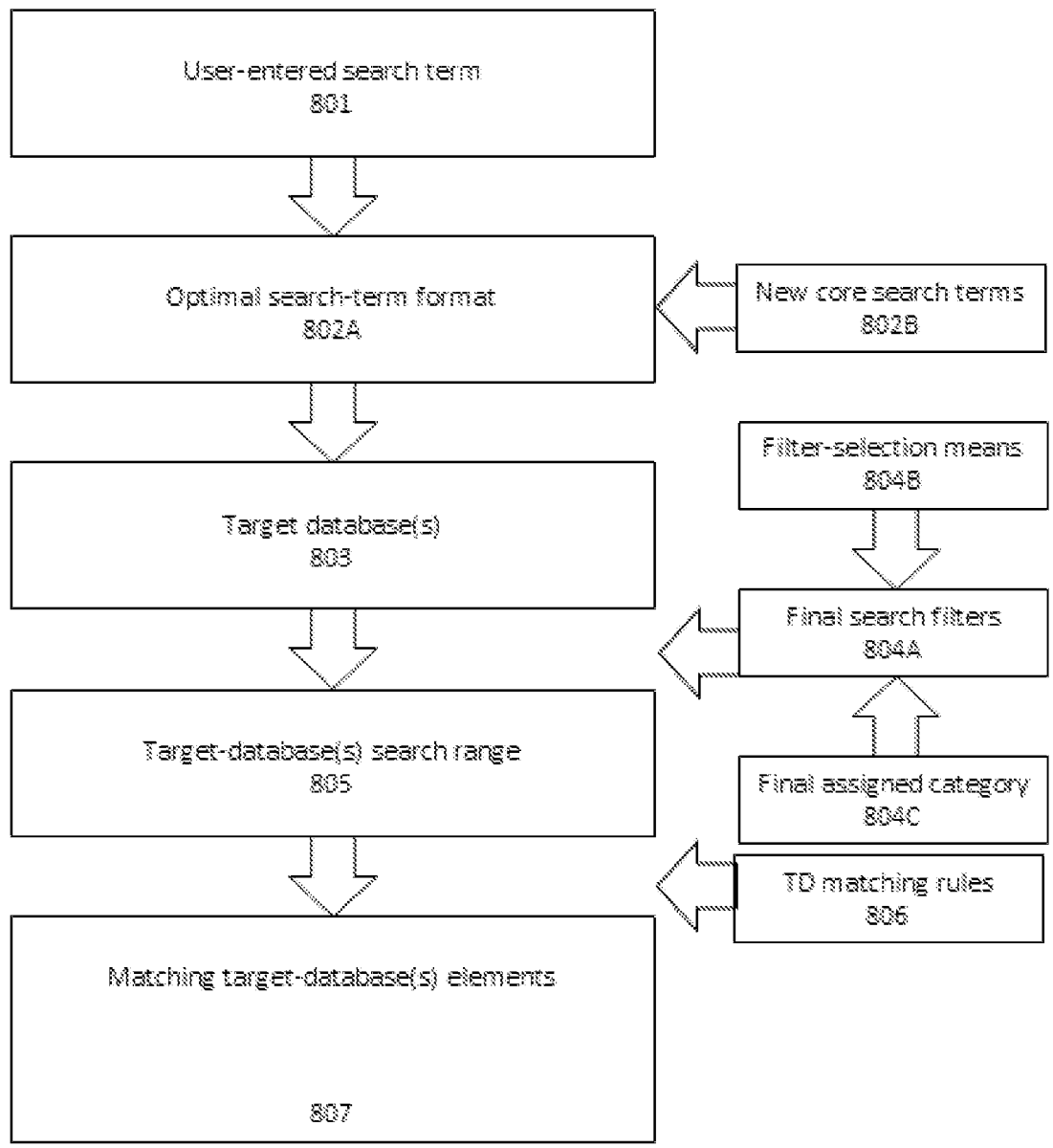
FIG. 8 illustrates a search of a target database with all of the pre-search search preparations having been completed according to an exemplary embodiment.

FIG. 8 illustrates an exemplary search of one or more target databases with all of the pre-search preparations having been completed. With these preparations in place, searches against the one or more target databases take place as follows. (1) The user-entered search term (Box 801, which is the same as Box 101 in FIG. 1) is passed through in its previously-defined optimal search-term format(s) (Box 802A, the same as Box 702C in FIG. 7), modified as desired, by the final core search term 802B (the same as Box 702L), to the one or more target databases (Box 803, the same as Box 704).

(2) The search range within the one or more target databases 803 is narrowed down, as desired, to either the target-database(s) filter search range (as mediated by the user-entered search term's 801 final search filters and associated filter values 804A, which is the same as Box 703) or the target-database(s) category search range (as mediated by the user-entered search term's 801 final assigned category 804C, which is the same at Box 706), or, if both conditions are applied, to the previously-defined target-database(s) search range, as shown in Box 805, which is the same as Box 705C. If desired, these search ranges also or alternatively can be defined and/or modified by one or more user-manipulated filter-value and/or category selection means (Box 804B), including, for example but without limitation, dropdown menus and accordion menus, with the user-manipulated selection means employed either not at all, in conjunction with the ranges so defined, or in place of the ranges so defined, and with the user-manipulated selection means implemented either before, during, or after the use of the ranges so defined.

(3) The search against the target database(s) search range is actually executed, using any appropriate search method and/or ranking system. The zero or more target-database(s) elements within the target-database(s) search range 805 that match the optimal search-term format(s) 802A ("matching target-database(s) elements") are presented as the results of the search (Box 807), with the degree of matching determined through the application of a set of general, category-specific, and/or target-database(s)-specific target-database(s) matching rules (Box 806).

Figure 9:
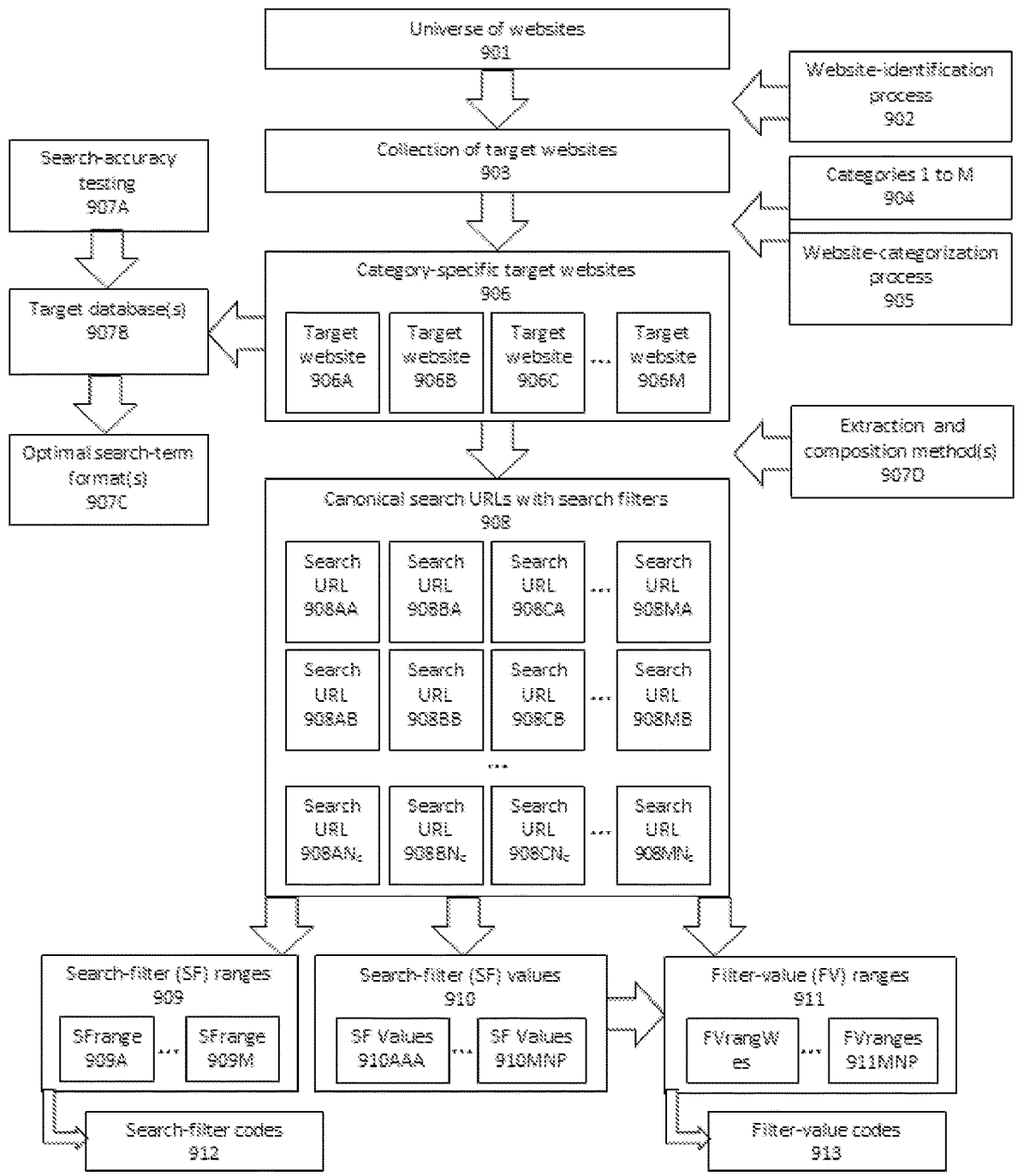
FIG. 9 illustrates an application of the search method to the process of individually searching a set of websites according to an exemplary embodiment.

FIG. 9 presents an exemplary application of the search method described above to the process of searching one or more sets of one or more websites in order to locate, identify, and/or enumerate specific types of information on such websites. Again by way of illustration, we will describe this process with respect to a search of website(s) on which products are sold, but the search can be undertaken as well for websites featuring services, news or information items, lists of websites, lists of web applications, lists of mobile applications, images, videos, and/or other pieces of data. This invention is intended to incorporate these and any other related search methods, modes, types, or search ranges, without limitation.

The set of one or more websites to be searched (referred to hereinafter as the "target websites"), shown in FIG. 906, is drawn from one or more collections of websites (hereinafter referred to as a "universe of websites") as depicted in Box 901. This universe of websites can be identified either automatically, manually, in some combination thereof, or in some other way, according to any number and/or types of criteria. This universe of websites can consist of all websites in total, some or all websites of a particular class, or some other group of websites, however defined.

The reduction of the universe of websites 901 to the set of target websites 906 takes place as follow. (1) One or more subsets of one or more websites from the universe of websites 901 (hereinafter referred to as the "target websites") is identified automatically, manually, in some combination thereof, or in some other way, according to any number and/or types of criteria. This website-identification process is depicted in Box 902, and the set of identified websites that results from this website-identification process (the entire collection of "target websites") is shown in Box 903.

The websites can be selected based upon one or more criteria, such as the extent of their public name recognition, the extent of usage or by visitation rankings according to some numerical measure, the presence of their physical counterparts in a range of physical shopping malls, user or shopper recommendations, social-media mentions and/or rankings, and/or their physical counterparts' physical locations in certain localities, regions, states, or countries. These and any other website-identification methods can be used individually, in conjunction with one, some, or all of the other methods, or not at all. The website-identification methods listed are meant to be illustrative only, and are not meant to limit the range or scope of the invention.

(2) Once identified, the identified websites 903 are then automatically and/or manually assigned into some or all of the one to M categories listed in Box 904 (which is the same as Box 104 from FIG. 1). By way of illustration, one exemplary set of categories might include "shoes," "jewelry," "jackets," "dresses," and so on. Categories can also include "electronics," "hardware," "home goods," "kitchen goods," and so on. These and any other categorization schema can be used individually, in conjunction with one, some, or all of the other schemas, or not at all. The categorization schema listed are meant to be illustrative only, and are not meant to limit the range or scope of the invention.

This segmentation of websites into categories takes place using any appropriate website-categorization process, as depicted in Box 905. For example, the websites can be assigned to categories based on whether they sell products of the type represented by respective categories, based on the number and/or volume of products they sell in these respective categories, and/or based on the uniqueness or originality of the products that they carry in the respective categories. These and any other website-categorization methods can be used individually, in conjunction with one, some, or all of the other methods, or not at all. The website-categorization methods listed are meant to be illustrative only, and are not meant to limit the range or scope of the invention.

(3) Undertaking the chosen website-categorization process(es) 905 produces one or more sets of one or more category-specific "target websites" shown in Boxes 906A through 906M, where there is one box for each of the 1 to M categories, and where "M" is an arbitrary value and not necessarily equal to any particular number. Any given website from among the identified websites 903 can be assigned to zero, one, more than one, or all of the 1 to M categories 904. However, even if certain websites are present in multiple categories, such websites maintain a unique identity within each respective category. By way of illustration, if a website called "Website Alpha" is placed in three categories Category x, Category y, and Category z, then these websites might be denominated, for organizational and/or identification purposes, as Web site $Alpha_x$, Web site $Alpha_y$, and Web site $Alpha_z$, where the subscripts refer to the individual categories, even though each reference is to the same overall website.

This collection of target websites 906 can be defined, selected, and/or prepared ahead of time, prior to executing an actual search against the websites, or contemporaneously with the conduct of such a search. Six examples of specific preparations that can be undertaken, among any number of preparation activities that might be pursued, are as follows: (1) A plurality of trial searches against the one or more sets of one or more target websites each are conducted, as shown in 907A, with a plurality of test search terms, using any appropriate search methodology applicable to the target websites in Box 907A (which is the same as in Box 906), in order to determine empirically whether searches with only a core search term, searches with broader search terms (such as for example, the original user-entered search term), or searches conducted with another search format produce more accurate search results against these particular one or more websites. The more accurate search term format resulting from these tests is referred to as the "optimal website-search format(s)," and is depicted in Box 907C. The "optimal website-search format(s)" can be uniform across search-term queries against the one or more target websites 906, or they can be varied according to search-term category, website type or category, or any other criteria, any combination of criteria, or no criteria at all. This search-accuracy testing is depicted in Box 907A and the set of one or more optimal search-term formats that results from such testing is collected in Box 907C.

(2) For each of the one or more sets of one or more target websites each 906, using some appropriate automatic and/or manual extraction and composition method(s) 907D, the canonical (that is, standard) structure of the "search version" of the uniform resource locator (URL) for each such website (referred to hereinafter as the "canonical search URL" or, more simply, the "search URL") is extracted and composed for each of the $N_c$ websites belonging to each respective category "c" (where "c" is a variable and not a specific number, and where the individual $N_c$ terms do not necessarily equal one another nor equal any particular value). By way of illustration, a set of category-specific target websites might include $N_1$ websites in Category 1, $N_2$ websites in Category 2, $N_3$ websites in Category 3, and so on, where some, all, or none of the $N_i$ terms can be equal to one another or can be different values.

The collection of canonical search URLs resulting from this extraction and composition process is shown in Box 908AA through Box 908MN$_c$. In this configuration, each of the $N_c$ websites in each category "c" is associated with one or more possibly unique search URLs extracted and composed for each website and category combination. By way of illustration, the website "Website Alpha," cited above, might have different and unique search URL structures and contents for each of three categories Category x, Category y, and Category z, while a second "Website Beta" might have different and unique search URL structures and contents for each of three categories Category x, Category y, and Category z, which also might differ from the search URL structures for Website Alpha, even within the same category.

Each such search URL itself includes some combination of variables arranged in a manner and/or order that will yield search results for a given user-entered search term. Among these search-URL variables are a set of zero or more "search filters," or criteria used to restrict the range of the search. These search filters can be assigned any of a number of "search-filter values," or specific values of the limiting criteria, to be discussed below. By way of illustration, a search URL constructed for a "Website Gamma" in the "shoes" category might include a search filter for "color," with certain search-filter values representing individual colors, which—when a search was executed—might restrict the range of search results to shoes or one or more specific colors.

The extraction and composition of search URLs, so defined, yields search URLs that incorporate one, some, or all pertinent search filters for each given category and website combination and that support a set of one or more search-filter values for each such search filter. For convenience of expression for any given search URL, search-filter placeholders are inserted in each search URL in place of the actual search-filter names and filter-value placeholders are inserted in each search URL in place of the actual filter values. By way of illustration, for the website named "Website Delta," if a given search-filter name were "Color," it might be represented in the search URL by the search-filter placeholder "ColorFilter." Likewise, if a given set of possible search-filter values were "red," "white," and "blue," they might be represented in the search URL collectively by the filter-value placeholder "ColorRange1." We will see the broader implications of this principle below.

By way of illustration, a category- and website-specific website search URL for the category "shoes" and some website called Website Epsilon might be:
http://search.website-epsilon.com/
category=shoes&GenderFilter=Gender1&ColorFilter=
ColorRange1&BrandFilter=BrandRange1&SizeFilter=
SizeRange1&term=searchterm.

In each case except for "term=searchterm," the term before the "=" sign is the search-filter placeholder for the actual filter name, and the term following the "=" sign is the filter-value placeholder for the actual filter value(s). Other search URLs for different category and website combinations, as encompassed by this description, can possess a different structure, different search filters, different filter orders, different search-filter names and placeholders, different filter-value locations within the URL string, different filter-value expressions and placeholders, and many other relevant differences.

Continuing this illustration, the canonical search URL above is representative of the search URL for a single category and website combination. This implies that each of the M×N combinations (where N is the average of all of the $N_c$ terms) in Box 908 are represented by one or more separate canonical search URLs, meaning that Box 908 contains at least M×N search URLs (where N is the average of all of the $N_c$ terms). Note, however, that not all of the search URLs in Box 908 are necessarily unique.

The search-URL extraction and composition process just described is the process of identifying and extracting the specific set of search filters for the search URL(s) for each category and website combination, and thereupon composing these search filters and other variables into a single search-URL string, perhaps but not necessarily similar to the search-URL string shown above. This extraction and composition process can take place either automatically or manually, in some combination thereof, or in some other way, and/or either individually or in some combination thereof. The extraction and composition method(s) so used are depicted in Box 907D. Thereinafter, the structure of one, more than one, or all of the resulting canonical search URLs in Boxes 908AA through 908MN$_c$ can be updated over time, either automatically or manually, in some combination thereof, or in some other way, either individually or in some combination thereof, and/or either continuously or periodically or on some other temporal basis.

(3) Each canonical search URL in Boxes 908AA through 908MN$_c$ contains a certain number P of search filters, where the number of search filters for a search URL for the category "c" and the website "w" is represented by $P_{c,w}$. The next task, then, is to identify and extract the total set of unique search filters across all websites within each of the 1 to M website categories, as represented in Box 908, and to compile them into a set of M collections of category-specific "search-filter ranges" for each such category, as shown in Boxes 909A through 909M. A "search-filter range" for a category "c" is the collection of all unique search filters used by the search URLs of all of the websites within that category, eliminating duplicates. These search-filter ranges are identified and compiled via one or more appropriate method(s), either manually, automatically, in some combination thereof, or in some other way. One, more than one, or all of the search-filter ranges can be updated over time, either automatically or manually, in some combination thereof, or in some other way, either individually or in some combination thereof, and/or either continuously or periodically or on some other temporal basis.

By way of illustration, if a single category included two websites, and if one website used two search filters ("Color" and "Brand") while the second website used three search filters ("Brand," "Gender," and "Size"), then the category-specific search-filter range for this category would be ("Color," "Brand," "Gender," "Size").

(4) Each of the $P_{c,w}$ search filters represented in Boxes 908AA to 908MN$_c$ supports Q search-filter values, where $Q_{c,w,p}$ is the number of search-filter values for search filter "p" for the website "w" in category "c." The next step is to identify and extract all of the unique search-filter values for each search filter for each website in each of the plurality of website categories, and to compile them into a set of unique search-filter values for each combination of website category, website, and search term. These search-filter values are identified and compiled via one or more appropriate method (s), either manually, automatically, in some combination thereof, or in some other way. The resulting collection of search-filter values is shown in Boxes 910AAA through 910MNP. One, more than one, or all of the search-filter values can be updated over time, either automatically or manually, in some combination thereof, or in some other way, either individually or in some combination thereof, and/or either continuously or periodically or on some other temporal basis.

(5) Next, the various search-filter values are aggregated on a filter-by-filter basis within each category, producing a "filter-value range" for each category and filter combination. Defined similarly as for the search-filter range, a "filter-value range" for a category "c" and search filter "p" is the collection of all unique search-filter values supported by that search filter in the respective search URLs for all of the websites in the category "c." By way of illustration, if a single category included two websites, each with a single filter "color," and if the "color" filter supported the filter values "black," "brown," and "white" for the first web site and the filter values "red," "white," and "blue" for the second website, then the filter-value range for the "color" filter in this category would be ("black," "brown," "red," "white," and "blue"). The collection of filter-value ranges is shown in Boxes 911AAA through 911MNP. One, more than one, or all of the filter-value ranges can be updated over time, either automatically or manually, in some combination thereof, or in some other way, either individually or in some combination thereof, and/or either continuously or periodically or on some other temporal basis.

(6) Once all of the search filters and filter values have been identified for the canonical search URL for each combination of category and website, as listed in Boxes 908AA through 908MN$_c$, the next step is to identify the website-specific search-filter codes and the filter-value codes for each search filter and search-filter value, respectively, in the set(s) of search-filter ranges and filter-value ranges. This is necessary because, in some cases, search filters are represented by their names in the canonical search URL; however, in other cases, the search filters are represented by a different word, an abbreviation, an alphanumeric string, a number, or some other indicator, which needs to be used in place of the search-filter name in order for the search URL to work. This collection of search-filter codes is shown in Box 912. One, more than one, or all of the search-filter codes can be updated over time, either automatically or manually, in some combination thereof, or in some other way, either individually or in some combination thereof, and/or either continuously or periodically or on some other temporal basis.

Likewise, in some cases, search-filter values are represented by the name of the value itself in the canonical search URL; however, in other cases, the search-filter values again can be represented by a different word, an abbreviation, an alphanumeric string, a number, or some other indicator, which again needs to be used in place of the search-filter value in order for the search URL to work. This collection of filter-value codes is shown in Box 913. One, more than one, or all of the filter-value codes can be updated over time, either automatically or manually, in some combination thereof, or in some other way, either individually or in some combination thereof, and/or either continuously or periodically or on some other temporal basis.

By way of illustration, consider a set of four canonical search URLs, one each for a given set of four category and website combinations. Assume further that each search URL has the filter "color" in common. The set of unique supported search-filter values (i.e., color values) across all category and website combinations (termed above as the "filter-value range") are: "black," "brown," and "white." However, as shown in the table below, each of the four search URLs expresses both the search filter itself and these search-filter values in a different way.

|  | Search URL A | Search URL B | Search URL C | Search URL D |
| --- | --- | --- | --- | --- |
| Search Filter |  |  |  |  |
| Color | Color1 | CLR | COLOR_101 | AX567 |
| Filter Values |  |  |  |  |
| Black | Black | BLK | Ebony | 00004570 |
| Brown | Brown | BRN | Brown or Tan | 00005432 |
| White | White | WHT | NULL | 00006022 |

In the above table, "Color" in Column 1 is the search filter, and the four alphanumeric strings following it are the search-filter codes actually used in each of the respective search URLs. Likewise, "Black," "Brown," and "White" in Column 1 are the search-filter values for "Color," and the four alphanumeric strings following each of these search-filter values are the filter-value codes actually used in each of the respective search URLs. Note that when there is no filter-value and hence no filter-value code present for a given category and website combination, a null value can be inserted.

Figure 10:
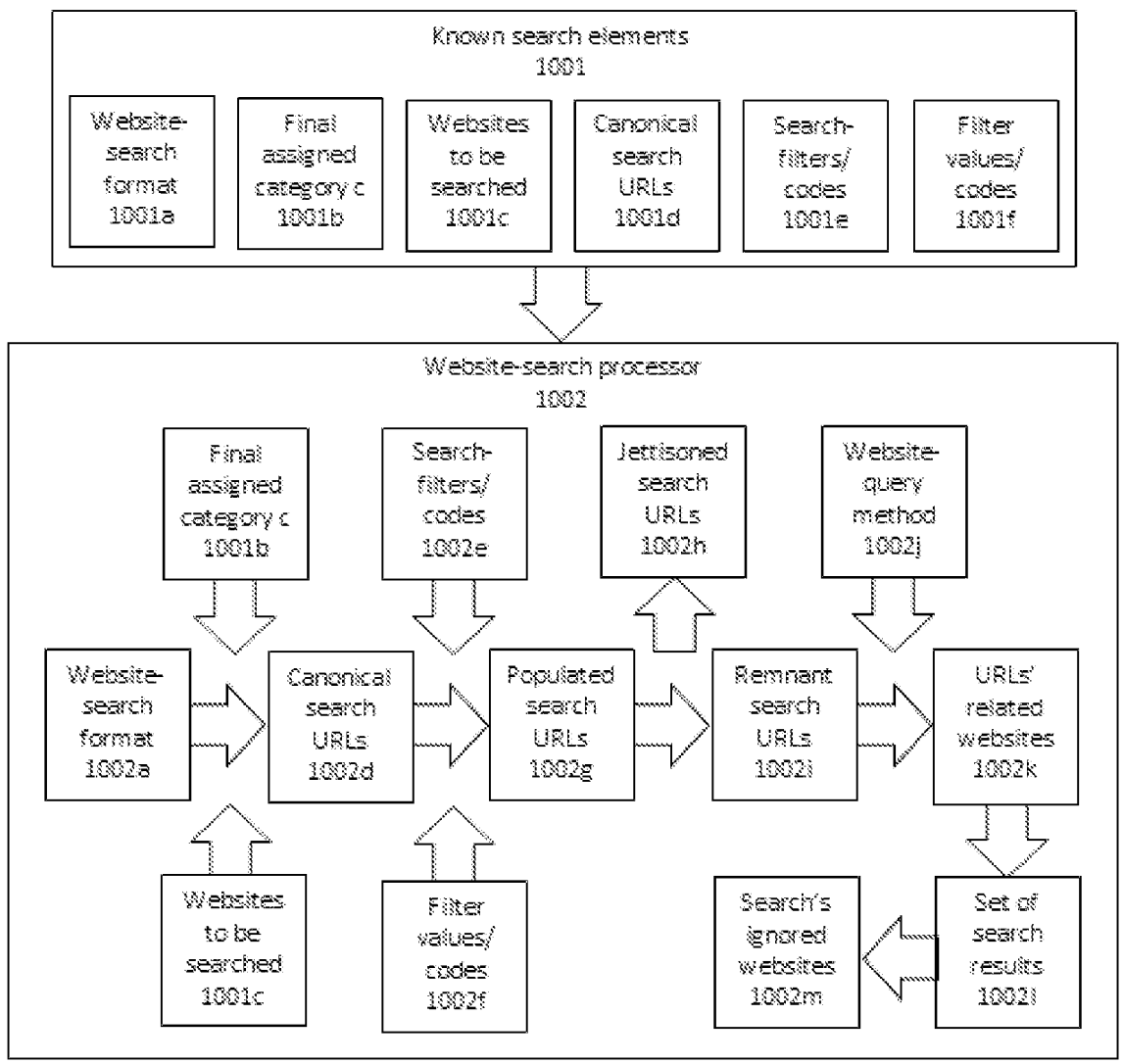
FIG. 10 illustrates a search of a set target websites with all of the pre-search search preparations having been completed according to an exemplary embodiment.
Figure 11:
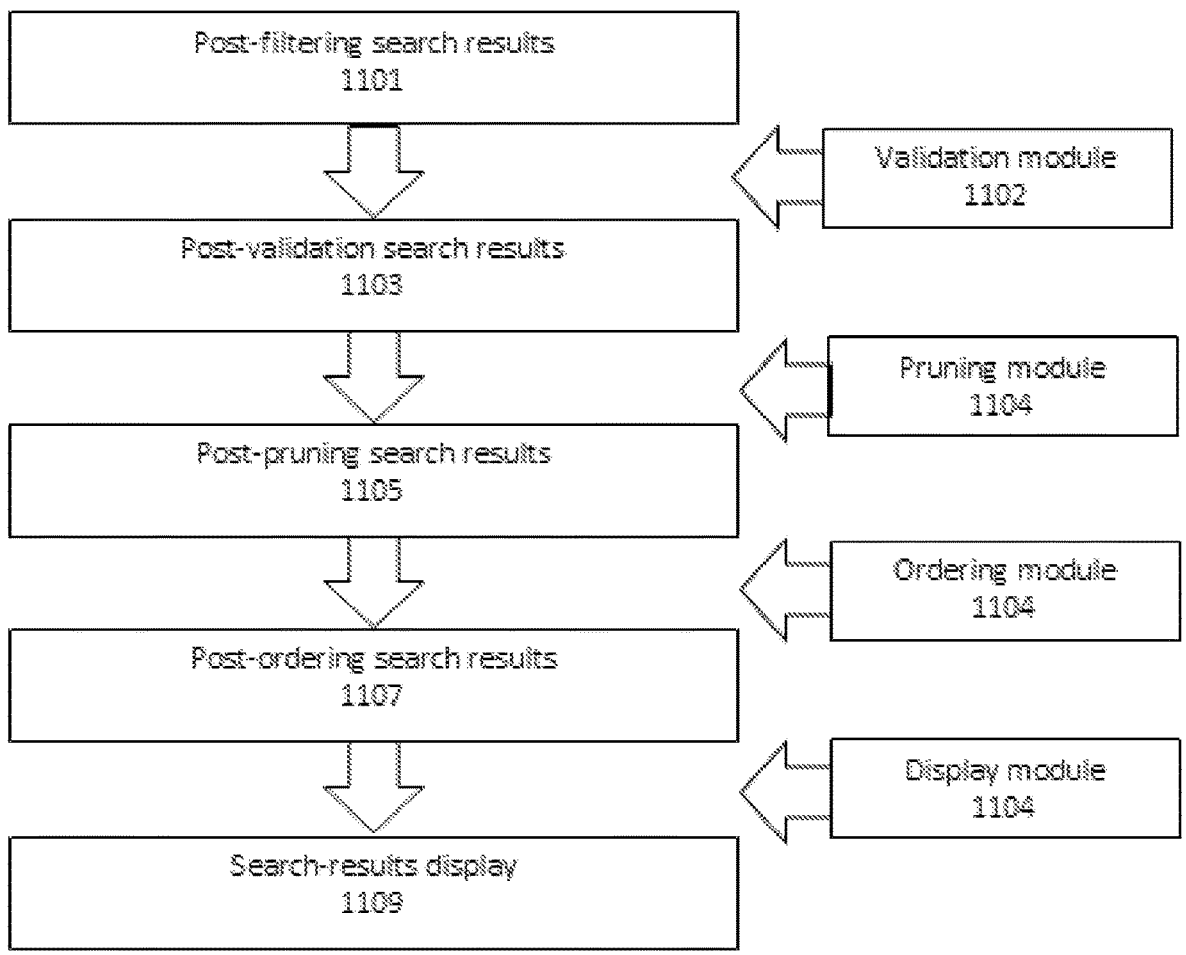
FIG. 11 illustrates a validation system used to validate search results according to an exemplary embodiment.

FIG. 10 illustrates an exemplary search of a set of target websites within a given category with all of the pre-search preparations having been completed. The search begins with these known search elements, as depicted in Box 1001: (1) the optimal website-search format(s), as shown in Box 1001a (which is the same as Box 907C); (2) the final assigned category, as shown in Box 1001b, which is the same as in Box 103 and Box 404) and which is denominated here by the arbitrary designation category "c"; (3) the list of target websites to be searched, as shown in Box 1001c, which is the same as the list of websites in Box 906M$_c$, which is the list of websites for the arbitrarily denominated category "c"; (4) the canonical search URLs for all of the websites in the arbitrary category "c," as shown in Box 1001d, which is the same as in Boxes 908M$_c$N$_c$, which is the collection of canonical search URLs for all of the websites in the arbitrarily denominated category "c"; (5) the collection of search filters and search-filter codes for all of the websites in the arbitrary category "c," which is shown in Box 1001e, and which is the same as the collection of search-filter values in Box 912 for all of the websites in the arbitrarily denominated category "c"; and (6) the collection of filter values and filter-value codes for all of the websites in the arbitrary category "c," as shown in Box 1001f, which is the same as the collection of filter-value codes in Box 913 for all of the websites in the arbitrary category "c."

Box 1002 depicts the website-search processor, which ingests all of the known search elements 1001 and then executes the actual search of the one or more sets of one or more target websites, using these steps. (1) The optimal website-search format(s) in Box 1002*a* (which is the same as Box 1001*a*), as guided by the final assigned category "c," as shown in Box 1002*b* (which is the same as Box 1001*b*), and by the one or more sets of one or more target websites to be searched for the final assigned category "c," as shown in Box 1002*c* (which is the same as 1001*c*), is passed to all of the canonical search URLs for all of the websites for the category "c" in Box 1002*d* (which is the same as Box 1001*d*).

(2) The collection of search filters and filter values for all of the target websites in the category "c," as shown in Box 1002*e* (which is the same as 1001*e*), and the collection of filter values and filter-value codes for all of the websites in the final assigned category "c," as shown in Box 1002*f* (which is the same as 1001*f*) are next input into all of the canonical search URLs for all of the websites in the final assigned category "c," as shown in Box 1002*d*. The result of these two actions yields the one or more sets of fully-populated canonical URLs for all of the websites in the final assigned category "c," as shown in Box 1002*g*.

(3) However, one or more of the target websites being searched can not support one or more given filter values derived from the optimal website-search format(s) 1002*a*. As a result, the fully-populated search URLs 1002*g* associated with these one or more websites ("unsupported websites") will have one or more null values in their search-URL strings, rendering the URLs unworkable as search mechanisms. These "unsupported websites" are identified, and their associated search URLs are jettisoned from further consideration, as shown in Box 1002*h*, leaving only a set of zero or more search URLs, as shown in Box 1002*i*. This process results in eliminating from further consideration those target websites whose attribute values do not match the corresponding filter values for the user-entered search term, leaving to be searched only those target websites whose attribute values do match all of the corresponding filter values for the user-entered search term.

By way of illustration, if, in a search for "shoes," the "gender" filter is set to "men's," but a certain website does not sell shoes for men, then that website's search URL will contain a null value for the "gender" filter, rendering that search URL unusable. As a result, that website is eliminated from further consideration without the system's having to interrogate the given website in the manner following.

(4) Using one or more appropriate website-query methods 1002*j*, the remnant category-specific search URLs 1002*i* are used to interrogate the search URLs' related websites 1002*k*, producing one or more sets of search results 1002*l* in any appropriate format(s). Only those websites 1002*k* that include positive results (indicating that each respective website includes the searched-for item(s) among its content or, in the case of product-based websites, carries the searched-for product) are collected as part of the search results 1002*l*, while all other related websites 1002*m* are ignored.

Returning to FIG. 1, Box 107 represents a validation, pruning, ordering, and display process, which prepares the results of the search process for viewing and then displays these results. This process is presented in more detail in FIG. 11, which depicts an exemplary validation, pruning, ordering, and display system to automatically determine whether each of the search-results generated by the search process actually contains nonzero results, orders these search-results according to one or more criteria, and then displays these results according to one or more criteria.

The post-filtering search-results, which seed the validation, pruning, ordering, and display process, are collectively depicted in Box 1101 (the same as Box 1002*l*). The validation module, shown in Box 1102, inspects each set of search results in order to ascertain and/or confirm whether such search-results sets contain positive (i.e., nonzero) search results, thereby indicating that elements matching the core search term and filter values associated with the user-entered search term were found.

The validation process works as follows. The validation module 1102 inspects each of the one or more sets of search results (for example, without limitation, the search results for each website within the one or more sets of one or more each) reports back for each set of search results either: (1) a binary value of either zero (no results) or one (nonzero results); (2) an ordinal value indicating the relative density of positive results among the reported search results; (3) a cardinal value indicating the absolute number of positive results among the reported search results; and/or (4) some other indicator denoting whether a given set of search results contains nonzero results. The outcome of the validation process is the post-validation search-results, show in Box 1103.

The pruning module, depicted in Box 1104, then prunes the one or more sets of post-validation search-results 1103 according to one or more preset and/or dynamically determined criterion(a), such as: (1) eliminating all sets of search results (for example, without limitation, all sets of website search results) that contain zero positive results; (2) eliminating all sets of search results that contain fewer than a specified density or number of results; and/or (3) eliminating all sets of search results that satisfy some other one or more chosen criterion(a). The outcome of the pruning process is the post-pruning search-results, show in Box 1105.

The ordering module, depicted in Box 1106, then places the one or more sets of post-pruning search-results 1105 in order according to one or more preset and/or dynamically determined criterion(a), such as, without limitation: (1) alphabetically; (2) popularity; (3) personalized interest; (4) user ratings; (5) number of results; (6) ordinal value of results; and/or (7) some other one or more chosen criterion (a). The outcome of the ordering process is the post-ordering search-results, show in Box 1107.

The display module, depicted in Box 1108, then displays the post-ordering search results in the order determined by the ordering module, as indicated by Box 1109. The search results can be displayed in a variety of formats. For example, each of the sets of search results (for example, without limitation, each website's search-results page) can open in one or more web-browser tabs in one or more web browsers, each of the sets of search results can open in one or more web-browser windows or web-based popup windows, each of the sets of search results can open on one or more web pages, web applications, mobile applications, data displays, and/or other form(s) of display method, and/or each of the sets of search results can open on one or more personal computers, tablet computers, server-connected displays, smartphones, television displays, automobile display, electronically-connected appliance display, and/or other electronic device(s).

The search results can also be browsed or acted upon using a variety of techniques. For example, Each of the sets of search results (for example, without limitation, each of the websites' search-results pages) can be viewed by scrolling, cycling, swiping, or otherwise navigating among them, users can select which sets of search results to open to view by selecting the search results in one or more ways, users can select which sets of search results to open to view by selecting individual sets of search results in one or more ways and then instructing the system to open all of them, and/or users can instruct the system to open all of the sets of search results at once. Additionally, users can view individual elements from the one or more sets of search results (for example, without limitation, individual products from among the websites' search-results pages) either mixed together at random; mixed together by element type or criterion(a); segmented according to search-results set and/or source (for example, without limitation, by individual product seller); and/or according to some other segmentation method(s). Users can also select among criteria and view either the sets of search results and/or elements of the sets of search results according to one or more filters, filter values, and/or ordering methods of their choosing.

The sets of search results (for example, without limitation, individual products of websites' search-results pages) can be displayed with reference to some one or more physical-world criteria (for example, whether such products are currently available and for sale in one or more physical stores), via integration with one or more physically-based electronic systems (for example, without limitation, a local-availability product database).

Users can be presented with recommended sets or search results and/or one or more elements from one or more sets of search results (for example, without limitation, one or more sets of one or more products) according to one or more selection criteria (for example, without limitation, proximity to the individual's physical location, similarity with those such elements that the individual has searched for and/or viewed previously, and/or one or more other selection criteria). Users can also view one or more elements from one or more sets of search results (for example, without limitation, one or more sets of one or more products) in conjunction with one or more sets of other types, style, manner, and/or variety of information (for example, without limitation, descriptions and pricing for comparatively-priced products), according to one or more sets of selection criteria.

Returning to FIG. 1, Box 108 represents the self-learning system, which feeds information, results, and/or experience from later stages of the search process back into earlier stages for purposes of increasing search accuracy, increasing personal relevance of search results, refining the search system and/or other systems, improving search efficiency, improving search speed, enhancing user experience, extracting, collecting, storing, and/or analyzing search-, user-, geography-, product-, and/or context-related data, and/or for one or more other purposes.

Figure 12:
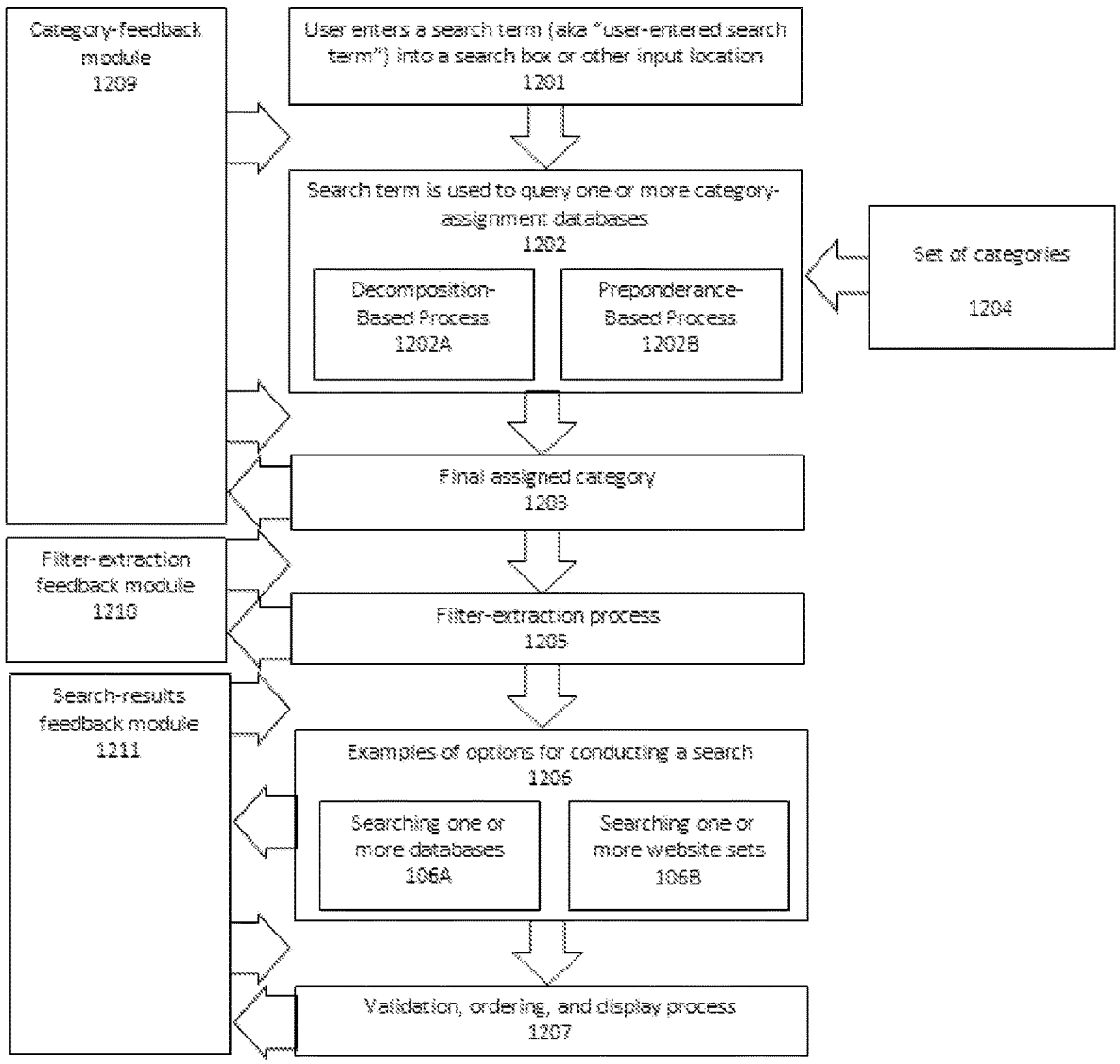
FIG. 12 illustrates a self-learning system according to an exemplary embodiment.

FIG. 12 expands on Box 108 in depicting, without limitation, one exemplary embodiment of such a self-learning system, which illustrates in one manner how information, results, and/or experience from the later stages of the search process might specifically be fed back into the earlier stages. Boxes 1201 through 1207 correspond to the respective elements in FIG. 1

In this one exemplary embodiment, Box 1209 depicts the category-feedback module, which associates previous user-entered search terms with their respective final assigned category and catalogues these associations for rapid retrieval. When a search term is entered that closely matches previous search terms, the category-feedback module: (1) automatically chooses the previous final assigned category recorded within a specified criterion-based timeframe, if the user-entered search-term match is exact, eliminating the need for the executing the category-assignment process; (2) intelligently predicts the new final assigned category using an algorithm incorporating the previous final category assignments and other factors, if the user-entered search-term match is close but not exact, reducing the need for the executing the category-assignment process; and/or (3) other related methods that have a similar effect.

Continuing this one exemplary embodiment, Box 1210 depicts the filter-extraction-feedback module, which associates previous user-entered search terms with their respective extracted filters and catalogues these associations for rapid retrieval. When a search term is entered that closely matches previous search terms, the filter-extraction-feedback module: (1) automatically chooses the previous final filter set and core search term recorded within a specified criterion-based timeframe, if the user-entered search-term match is exact, eliminating the need for the executing the filter-extraction process; (2) intelligently predicts the new final filter set and core search term using an algorithm incorporating the previous filter extractions and other factors, if the user-entered search-term match is close but not exact, reducing the need for the executing the filter-extraction process; and/or (3) other related methods that have a similar effect.

Continuing this one exemplary embodiment, Box 1211 depicts the search-results-feedback module, which associates previous user-entered search terms with their respective search mode (e.g., searching a database, searching a set of websites, and so on) and search results and catalogues these associations for rapid retrieval. When a search term is entered that closely matches previous search terms, the filter-extraction-feedback module: (1) automatically chooses the previous search results recorded within a specified criterion-based timeframe, if the user-entered search-term match is exact, eliminating the need for the executing the search process; (2) intelligently predicts the new final search results using an algorithm incorporating the previous search results and other factors, if the user-entered search-term match is close but not exact, reducing the need for the executing the search process; and/or (3) other related methods that have a similar effect.

Information, results, and/or experience from one or more stages of the search process can be extracted, collected, stored, analyzed, and/or otherwise acted upon according to one or more data-manipulation, presentation, interpretation, and/or analytical methods in a plurality of ways on a plurality of devices for a plurality of purposes.

The methods, systems, and computer-readable media for conducting keyword-based searches disclosed herein offer a number of technical advantages and improve both the function of computing devices used to conduct searches and the technical field of automatic information retrieval.

By extracting and applying specific search filters and filter values in the search process in a precise manner—contrary to the more probabilistic method employed by most current search methods and systems—the methods, systems, and computer-readable media described herein can deliver significantly more accurate search results and significantly fewer inaccurate results.

By producing both more accurate results and results from among a carefully vetted and curated set of products and/or websites, the methods, systems, and computer-readable media described herein can significantly reduce the time required to review the search results and to find precisely what is sought much more rapidly than is possible with current search methods and systems—an advantage that is especially pronounced on mobile devices with smaller screens and slower data-transmission speeds.

The mobile embodiment of the methods and systems described herein can be utilized to enable users to locate available products in physical stores, and quickly compare these products with those that are available online.

The data-collection functions and learning and feedback capabilities of the methods and systems described herein can be employed to build an analytics system that can generate a deeper understanding of the relationship between user interests and preferences and the most desirable search results, based on products or website links clicked on and other factors.

The accuracy, speed, and data-analytics capabilities of the methods and systems described herein can be employed to present users with more precise product and website recommendations and more accurate and complete price-comparison options than is possible with most current search methods and systems.

Figure 13:
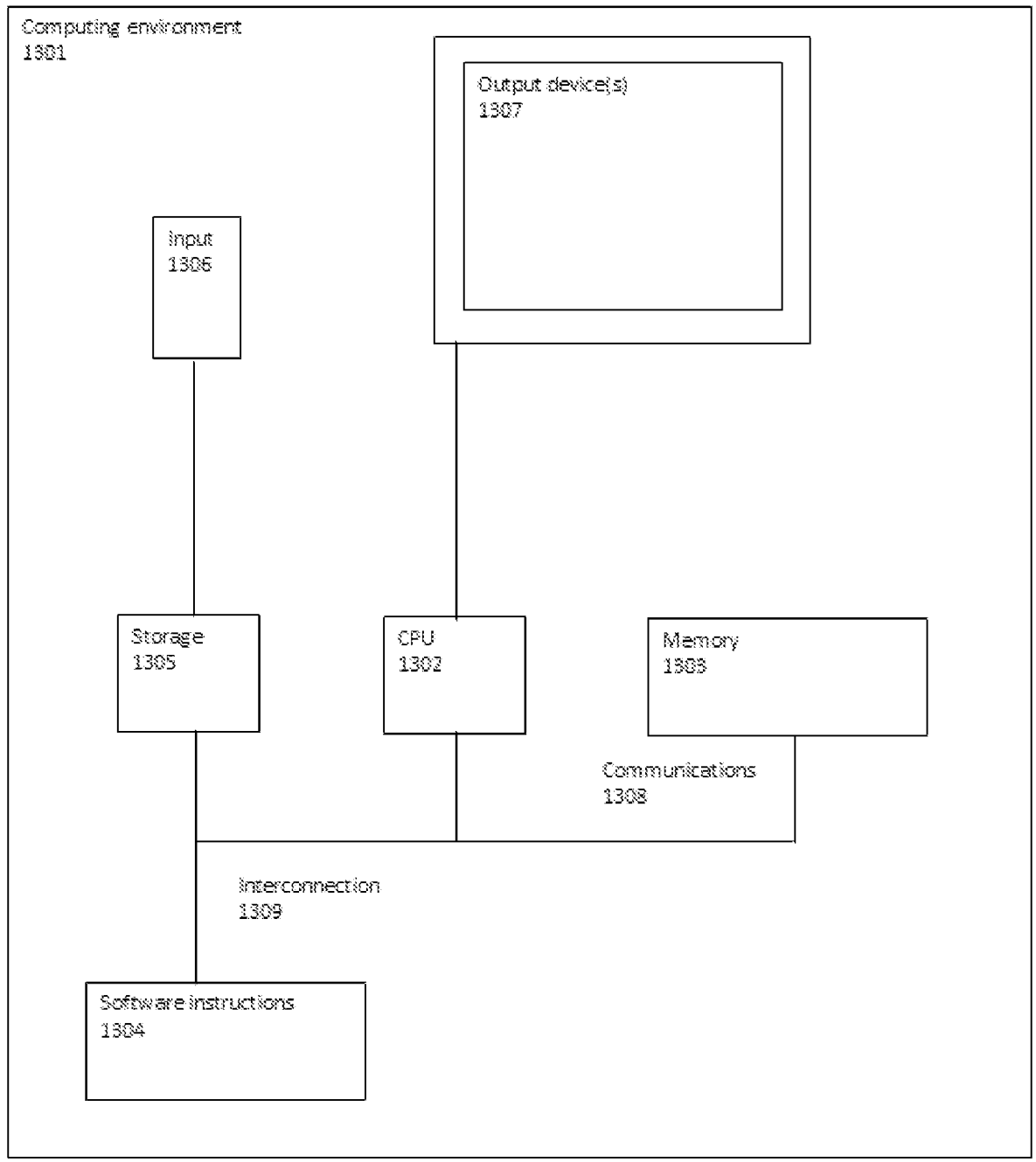
FIG. 13 illustrates an exemplary computing environment that can be used to carry out the method for generating categorical and criterion-based search results from a search query.

One or more of the above-described techniques can be implemented in or involve one or more computer systems. FIG. 13 illustrates a generalized example of such a computing environment. The computing environment 1300 is not intended to suggest any limitations as to the scope or use or functionality of any described embodiment. For example, the computing environment can include one or more computers, mobile devices, tables, portable-computing devices such as smart watches, and so on.

With reference to FIG. 13, the computing environment 1301 includes at least one processing unit 1302 and memory 1303. The processing unit 1301 executes computer-executable instructions and can be a real or a virtual processor. In a multi-processor system, multiple processing units execute computer-executable instructions to increase processing power. The memory 1303 can be volatile memory (e.g., registers, cache, RAM), non-volatile memory (e.g., ROM, EEPROM, flash memory, etc.), or some combination of the two. The memory 1303 can store software instructions 1304 for implementing the described techniques when executed by one or more processors. Memory 1303 can be one memory device or multiple memory devices.

A computing environment can have additional features. For example, the computing environment 1301 includes storage 1305, one or more input devices 1306, one or more output devices 1307, and one or more communication connections 1308. An interconnection mechanism 1309, such as a bus, controller, or network, interconnects the components of the computing environment 1301. Typically, operating-system software or firmware (not shown) provides an operating environment for other software executing in the computing environment 1300, and coordinates activities of the components of the computing environment 1300.

The storage 1305 can be removable or non-removable, and includes magnetic disks, magnetic tapes or cassettes, CD-ROMs, CD-RWs, DVDs, or any other medium that can be used to store information and that can be accessed within the computing environment 1301. The storage 1305 also can store instructions for the software 1304.

The input device(s) 1306 can be a touch input device such as a keyboard, mouse, pen, trackball, touch screen, or game controller, a voice input device, a scanning device, a digital camera, a remote control, or another device that provides input to the computing environment 1300. The output device(s) 1307 can be a display, television, monitor, printer, speaker, or another device that provides output from the computing environment 1301.

The communication connection(s) 1308 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 1301, computer-readable media include memory 1303, storage 1305, communication media 1308, and combinations of any of the above.

Of course, FIG. 13 illustrates computing environment 1301, input device 1306, and output device 1307 as separate devices for ease of identification only. Computing environment 1301, input device 1306, and output device 1307 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 1301 can be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. It should be understood that the programs, processes, methods, or systems described herein are not related or limited to any particular type of computing environment, unless indicated otherwise. Various types of general purpose or specialized computing environments can be used with or perform operations in accordance with the teachings described herein. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

What is claimed is:

1. A method executed by one or more computing devices for generating categorical and criterion-based search results from a search query, the method comprising:

generating, by at least one of the one or more computing devices, one or more query fragments by parsing a search query based at least in part on one or more decomposition rules;

determining, by at least one of the one or more computing devices, a category corresponding to the search query;

determining, by at least one of the one or more computing devices, one or more filters applicable to the search query and one or more search terms applicable to the search query based at least in part on the determined category and the one or more query fragments, wherein each filter in the one or more filters corresponds to a query fragment in the one or more query fragments;

generating, by at least one of the one or more computing devices, at least one custom query for at least one target database in one or more target databases based at least in part on the one or more filters, the one or more search terms, the determined category, each custom query defining at least one filter specific to each target database and at least one category specific each target database; and executing, by at least one of the one or more computing devices, the at least one custom query on the at least one target database to generate a set of search results.

2. The method of claim 1, wherein determining a category corresponding to the search query comprises:

determining a decomposition category corresponding to the search query based at least in part on the one or more query fragments;

determining a preponderance category corresponding to the search query based at least in part on a distribution of search results when the search query is executed on one or more databases; and determining the category corresponding to the search query based at least in part on one or more of the decomposition category and the preponderance category.

3. The method of claim 2, wherein determining a decomposition category corresponding to the search query comprises:

mapping the at least one query fragment to at least one canonical fragment based at least in part on one or more secondary decomposition rules and one or more canonical term dictionaries; and mapping the at least one canonical fragment to the at least one candidate decomposition category based at least in part on the one or more category indicators corresponding to one or more decomposition categories and the one or more category-comparison rules; and determining the decomposition category based at least in part on the at least one candidate decomposition category and one or more category-determination rules.

4. The method of claim 1, wherein determining one or more filters applicable to the search query and one or more search terms applicable to the search query comprises:

identifying a plurality of filters corresponding the determined category based at least in part on one or more filter-extraction rules;

mapping at least one query fragment in the one or more query fragments to at least one corresponding filter in the plurality of filters based at least in part on a comparison between the at least one query fragment and one or more attributes of the plurality of filters; and mapping any remaining query fragments in the one or more query fragments to the one or more search terms.

5. The method of claim 1, wherein generating at least one custom query for at least one target database in one or more target databases comprises:

determining at least one final filter from the one or more filters based at least in part on at least one of the one or more attributes of the target database;

updating the one or more search terms based at least in part on any filters in the one or more filters which are not included in the at least one final filter;

determining at least one target database filter corresponding to the at least one final filter based at least in part on at least one of the one or more attributes of the target database;

determining at least one target database filter search range corresponding to the at least target database filter based at least in part on at least one of the one or more attributes of the target database;

determining at least one target database category and at least one target database category range corresponding to the determined category based at least in part on at least one of the one or more attributes of the target database; and generating the at least one custom query based at least in part on the updated one or more search terms, the at least one target database filter, the at least one target database filter search range, the at least one target database category, and the at least one target database category range.

6. The method of claim 1, wherein the at least one target database comprises at least one website and wherein executing the at least one custom query on the at least one target database to generate a set of search results comprises, for each website in the at least one website:

retrieving a Uniform Resource Locator (URL) corresponding to a search page of the website;

generating at least one custom URL corresponding to the search page of the website based at least in part on the retrieved URL, the at least one filter defined in the custom query, and the at least one category defined in the custom query;

interrogating the website using the at least one custom URL to generate at least one group of search results; and aggregating the at least one group of search results into the set of search results.

7. A apparatus for generating categorical and criterion-based search results from a search query, the apparatus comprising:

one or more processors; and one or more memories operatively coupled to at least one of the one or more processors and having instructions stored thereon that, when executed by at least one of the one or more processors, cause at least one of the one or more processors to:

generate one or more query fragments by parsing a search query based at least in part on one or more decomposition rules;

determine a category corresponding to the search query;

determine one or more filters applicable to the search query and one or more search terms applicable to the search query based at least in part on the determined category and the one or more query fragments, wherein each filter in the one or more filters corresponds to a query fragment in the one or more query fragments;

generate at least one custom query for at least one target database in one or more target databases based at least in part on the one or more filters, the one or more search terms, the determined category, each custom query defining at least one filter specific to each target database and at least one category specific each target database; and execute the at least one custom query on the at least one target database to generate a set of search results.

8. The apparatus of claim 7, wherein the instructions that, when executed by at least one of the one or more processors, cause at least one of the one or more processors to determine a category corresponding to the search query further cause at least one of the one or more processors to:

determine a decomposition category corresponding to the search query based at least in part on the one or more query fragments;

determine a preponderance category corresponding to the search query based at least in part on a distribution of search results when the search query is executed on one or more databases; and determine the category corresponding to the search query based at least in part on one or more of the decomposition category and the preponderance category.

9. The apparatus of claim 8, wherein the instructions that, when executed by at least one of the one or more processors, cause at least one of the one or more processors to determine a decomposition category corresponding to the search query further cause at least one of the one or more processors to:

map the at least one query fragment to at least one canonical fragment based at least in part on one or more secondary decomposition rules and one or more canonical term dictionaries;

map the at least one canonical fragment to the at least one candidate decomposition category based at least in part on the one or more category indicators corresponding to one or more decomposition categories and the one or more category-comparison rules; and determine the decomposition category based at least in part on the at least one candidate decomposition category and one or more category-determination rules.

10. The apparatus of claim 7, wherein the instructions that, when executed by at least one of the one or more processors, cause at least one of the one or more processors to determine one or more filters applicable to the search query and one or more search terms applicable to the search query further cause at least one of the one or more processors to:

identify a plurality of filters corresponding the determined category based at least in part on one or more filter-extraction rules;

map at least one query fragment in the one or more query fragments to at least one corresponding filter in the plurality of filters based at least in part on a comparison between the at least one query fragment and one or more attributes of the plurality of filters; and map any remaining query fragments in the one or more query fragments to the one or more search terms.

11. The apparatus of claim 7, wherein the instructions that, when executed by at least one of the one or more processors, cause at least one of the one or more processors to generate at least one custom query for at least one target database in one or more target databases further cause at least one of the one or more processors to:

determine at least one final filter from the one or more filters based at least in part on at least one of the one or more attributes of the target database;

updating the one or more search terms based at least in part on any filters in the one or more filters which are not included in the at least one final filter;

determine at least one target database filter corresponding to the at least one final filter based at least in part on at least one of the one or more attributes of the target database;

determine at least one target database filter search range corresponding to the at least target database filter based at least in part on at least one of the one or more attributes of the target database;

determine at least one target database category and at least one target database category range corresponding to the determined category based at least in part on at least one of the one or more attributes of the target database; and generate the at least one custom query based at least in part on the updated one or more search terms, the at least one target database filter, the at least one target database filter search range, the at least one target database category, and the at least one target database category range.

12. The apparatus of claim 7, wherein the at least one target database comprises at least one website and wherein the instructions that, when executed by at least one of the one or more processors, cause at least one of the one or more processors to execute the at least one custom query on the at least one target database to generate a set of search results further cause at least one of the one or more processors to, for each website in the at least one website:

retrieve a Uniform Resource Locator (URL) corresponding to a search page of the website;

generate at least one custom URL corresponding to the search page of the website based at least in part on the retrieved URL, the at least one filter defined in the custom query, and the at least one category defined in the custom query;

interrogate the website using the at least one custom URL to generate at least one group of search results; and aggregate the at least one group of search results into the set of search results.

13. At least one non-transitory computer-readable medium storing computer-readable instructions that, when executed by one or more computing devices, cause at least one of the one or more computing devices to:

generate one or more query fragments by parsing a search query based at least in part on one or more decomposition rules;

determine a category corresponding to the search query;

determine one or more filters applicable to the search query and one or more search terms applicable to the search query based at least in part on the determined category and the one or more query fragments, wherein each filter in the one or more filters corresponds to a query fragment in the one or more query fragments;

generate at least one custom query for at least one target database in one or more target databases based at least in part on the one or more filters, the one or more search terms, the determined category, each custom query defining at least one filter specific to each target database and at least one category specific each target database; and execute the at least one custom query on the at least one target database to generate a set of search results.

14. The at least one non-transitory computer-readable medium of claim 13, wherein the instructions that, when executed by at least one of the one or more computing devices, cause at least one of the one or more computing devices to determine a category corresponding to the search query further cause at least one of the one or more computing devices to:

determine a decomposition category corresponding to the search query based at least in part on the one or more query fragments;

determine a preponderance category corresponding to the search query based at least in part on a distribution of search results when the search query is executed on one or more databases; and determine the category corresponding to the search query based at least in part on one or more of the decomposition category and the preponderance category.

15. The at least one non-transitory computer-readable medium of claim 14, wherein the instructions that, when executed by at least one of the one or more computing devices, cause at least one of the one or more computing devices to determine a decomposition category corresponding to the search query further cause at least one of the one or more computing devices to:
- map the at least one query fragment to at least one canonical fragment based at least in part on one or more secondary decomposition rules and one or more canonical term dictionaries;
- map the at least one canonical fragment to the at least one candidate decomposition category based at least in part on the one or more category indicators corresponding to one or more decomposition categories and the one or more category-comparison rules; and
- determine the decomposition category based at least in part on the at least one candidate decomposition category and one or more category-determination rules.

16. The at least one non-transitory computer-readable medium of claim 13, wherein the instructions that, when executed by at least one of the one or more computing devices, cause at least one of the one or more computing devices to determine one or more filters applicable to the search query and one or more core search terms applicable to the search query further cause at least one of the one or more computing devices to:
- identify a plurality of filters corresponding the determined category based at least in part on one or more filter-extraction rules;
- map at least one query fragment in the one or more query fragments to at least one corresponding filter in the plurality of filters based at least in part on a comparison between the at least one query fragment and one or more attributes of the plurality of filters; and
- map any remaining query fragments in the one or more query fragments to the one or more core search terms.

17. The at least one non-transitory computer-readable medium of claim 13, wherein the instructions that, when executed by at least one of the one or more computing devices, cause at least one of the one or more computing devices to generate at least one custom query for at least one target database in one or more target databases further cause at least one of the one or more computing devices to:
- determine at least one final filter from the one or more filters based at least in part on at least one of the one or more attributes of the target database;
- updating the one or more search terms based at least in part on any filters in the one or more filters which are not included in the at least one final filter;
- determine at least one target database filter corresponding to the at least one final filter based at least in part on at least one of the one or more attributes of the target database;
- determine at least one target database filter search range corresponding to the at least target database filter based at least in part on at least one of the one or more attributes of the target database;
- determine at least one target database category and at least one target database category range corresponding to the determined category based at least in part on at least one of the one or more attributes of the target database; and
- generate the at least one custom query based at least in part on the updated one or more search terms, the at least one target database filter, the at least one target database filter search range, the at least one target database category, and the at least one target database category range.

18. The at least one non-transitory computer-readable medium of claim 13, wherein the at least one target database comprises at least one website and wherein the instructions that, when executed by at least one of the one or more computing devices, cause at least one of the one or more computing devices to execute the at least one custom query on the at least one target database to generate a set of search results further cause at least one of the one or more computing devices to, for each website in the at least one website:
- retrieve a Uniform Resource Locator (URL) corresponding to a search page of the website;
- generate at least one custom URL corresponding to the search page of the website based at least in part on the retrieved URL, the at least one filter defined in the custom query, and the at least one category defined in the custom query;
- interrogate the website using the at least one custom URL to generate at least one group of search results; and
- aggregate the at least one group of search results into the set of search results.

* * * * *